US008380205B2

(12) United States Patent
Hogan

(10) Patent No.: US 8,380,205 B2
(45) Date of Patent: Feb. 19, 2013

(54) TRANSMISSION OF FILTERING/FILTERED INFORMATION OVER THE IUR INTERFACE

(75) Inventor: William D. Hogan, Galway (IE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1241 days.

(21) Appl. No.: 11/635,797

(22) Filed: Dec. 8, 2006

(65) Prior Publication Data

US 2007/0202877 A1    Aug. 30, 2007

Related U.S. Application Data

(63) Continuation of application No. 09/932,447, filed on Aug. 20, 2001, now Pat. No. 7,184,710.

(60) Provisional application No. 60/268,065, filed on Feb. 13, 2001.

(51) Int. Cl.
*H04W 36/00* (2009.01)

(52) U.S. Cl. ........ 455/439; 455/436; 455/438; 455/440; 455/443; 370/331; 370/332

(58) Field of Classification Search ............... 455/67.11, 455/436, 432.1, 432.2, 433, 439, 45.2, 438
See application file for complete search history.

(56) References Cited

U.S. PATENT DOCUMENTS

| | | | |
|---|---|---|---|
| 5,276,907 | A | 1/1994 | Meidan |
| 5,345,467 | A | 9/1994 | Lomp et al. |

(Continued)

FOREIGN PATENT DOCUMENTS

| | | |
|---|---|---|
| EP | 0 888 026 A2 | 12/1998 |
| WO | 95/15665 | 6/1995 |

(Continued)

OTHER PUBLICATIONS

EP Communication mailed Sep. 8, 2009 in corresponding EP application 02712563.2.

(Continued)

*Primary Examiner* — Rafael Pérez-Gutiérrez
*Assistant Examiner* — Allahyar Kasraian
(74) *Attorney, Agent, or Firm* — Nixon & Vanderhye, P.C.

(57) ABSTRACT

In a radio access network, a drift radio network controller (DRNC) [$26_2$] transmits to a serving radio network controller (SRNC) [$26_1$] either (1) a filtering rule for a candidate cell [so that the serving radio network controller (SRNC) can generate a measurement list for a user equipment unit having a connection controlled by the serving radio network controller (SRNC)], or (2) a list of cells qualifying [according to filtering rules stored at and applied by the drift radio network controller (DRNC)] for inclusion in the measurement list for the user equipment unit. The filtering rule provides criteria useful for determining whether the candidate cell qualifies for inclusion in the measurement list of cells for the user equipment unit. If the candidate cell is a shared cell or cell for which the user equipment unit otherwise has permission for usage, the candidate cell qualifies for inclusion in the measurement list for the user equipment unit. On the other hand, if the candidate cell is a unshared cell for which the user equipment unit has no permission for usage, the candidate cell does not qualify for inclusion in the measurement list for the user equipment unit. The filtering rule itself can take various forms, and the filtering rule-bearing Iur message can have various formats possibly with transmission economizing features of the invention. In one mode of the invention, the drift radio network controller (DRNC) may itself apply the filtering rule to determine whether the candidate cell qualifies for the measurement list. In a hybrid mode, filtering functions are initially performed by the serving radio network controller (SRNC) and subsequently performed by the drift radio network controller (DRNC).

26 Claims, 20 Drawing Sheets

U.S. PATENT DOCUMENTS

| | | | |
|---|---|---|---|
| 5,425,029 A | | 6/1995 | Hluchyj et al. |
| 5,640,414 A | | 6/1997 | Blakeney, II et al. |
| 5,678,184 A | * | 10/1997 | Cutler et al. ............ 455/436 |
| 5,771,275 A | | 6/1998 | Brunner et al. |
| 5,828,962 A | * | 10/1998 | Ho-A-Chuck ............ 455/446 |
| 5,845,203 A | | 12/1998 | LaDue |
| 5,870,427 A | | 2/1999 | Tiedemann, Jr. et al. |
| 5,873,036 A | | 2/1999 | Vucetic |
| 5,903,832 A | | 5/1999 | Seppanen et al. |
| 5,905,950 A | * | 5/1999 | Anell ............ 455/421 |
| 5,915,221 A | * | 6/1999 | Sawyer et al. ............ 455/437 |
| 5,999,811 A | | 12/1999 | Mölne |
| 6,009,332 A | * | 12/1999 | Haartsen ............ 455/450 |
| 6,044,265 A | * | 3/2000 | Roach, Jr. ............ 455/419 |
| 6,128,490 A | | 10/2000 | Shaheen et al. |
| 6,230,017 B1 | * | 5/2001 | Andersson et al. ........ 455/456.6 |
| 6,233,222 B1 | | 5/2001 | Wallentin |
| 6,387,027 B1 | * | 5/2002 | Bodin ............ 455/419 |
| 6,421,328 B1 | * | 7/2002 | Larribeau et al. ............ 370/329 |
| 6,567,663 B1 | * | 5/2003 | Otting et al. ............ 455/434 |
| 6,674,736 B1 | * | 1/2004 | Tiedemann, Jr. ............ 370/332 |
| 6,922,562 B2 | * | 7/2005 | Ward et al. ............ 455/436 |
| 6,950,419 B1 | * | 9/2005 | Park et al. ............ 370/338 |
| 6,952,583 B1 | * | 10/2005 | Park et al. ............ 455/434 |
| 6,970,708 B1 | * | 11/2005 | Raith ............ 455/440 |
| 7,003,297 B2 | * | 2/2006 | Willars et al. ............ 455/436 |
| 7,072,656 B2 | * | 7/2006 | Willars et al. ............ 455/436 |
| 7,096,018 B2 | * | 8/2006 | Mikami ............ 455/435.1 |
| 7,106,710 B1 | * | 9/2006 | Smith ............ 370/331 |
| 7,184,710 B2 | | 2/2007 | Hogan |
| 2002/0105927 A1 | * | 8/2002 | Holma et al. ............ 370/331 |
| 2003/0013443 A1 | | 1/2003 | Willars et al. |

FOREIGN PATENT DOCUMENTS

| | | |
|---|---|---|
| WO | 97/03531 A | 1/1997 |
| WO | 98/06226 | 2/1998 |
| WO | 99/45735 A | 9/1999 |
| WO | 99/67902 | 12/1999 |
| WO | 00/44189 A | 7/2000 |

OTHER PUBLICATIONS

U.S. Appl. No. 60/268,065, filed Feb. 13, 2001, entitled "Handover in a Shared Radio Access Network Environment Using Subscriber-Dependent Neighbor Cell Lists".

U.S. Appl. No. 60/301,442, filed Jun. 29, 2001, entitled "Partial Support of Mobility Between Radio Access Network".

U.S. Appl. No. 60/282,486, filed Apr. 10, 2001 entitled "Commanding Handover Between Differing Radio Access Technologies".

U.S. Appl. No. 09/286,471, filed Apr. 6, 1999 entitled "Inter-System Handover—Generic Handover Mechanism".

U.S. Appl. No. 10/068,012, filed Feb. 8, 2002, entitled "Handover in a Shared Radio Access Network Environment Using Subscriber Dependent Neighbor Cell Lists".

U.S. Appl. No. 10/068,000, filed Feb. 8, 2002, entitled "Partial Support of Mobility Between Radio Access Networks".

U.S. Appl. No. 10/068,001, filed Feb. 8, 2002, entitled "Coordinated Subscriber Access Handling for Shared Network Support".

U.S. Appl. No. 09/852,915, filed May 11, 2001 entitled "Releasing Plural Radio Connections with Omnibus Release Message".

ITU-T Recommendation Q.2630.1, Series Q: Switching and Signalling, Broadband ISDN—Common Aspects of B-ISDN Application Protocols for Access Signalling and Network Signalling and Interworking, AAL Type 2 Signalling Protocol—Capability Set 1, Dec. 1999.

3GPP TS 25.304, V3.9.0 (Dec. 2001); $3^{rd}$ Generation Partnership Project; Tech. Spec. Group Radio Access Network; UE Procedures in Idle Mode and Procedures for Cell Reselection in Connected Mode (Release 1999).

3GPP TS 24.008, V10.0 (Dec. 2001), $3^{rd}$ Generation Partnership Project; Tech. Spec. Group Core Network; Mobile Radio Interface Layer 3 Specification; Core Network Protocols—Stage 3 (Release 1999).

3GPP TS 25.331, V3.6.0 (Mar. 2001), $3^{rd}$ Generation Partnership Project; Tech. Spec. Group Radio Access Network; RRC Protocol Specification (Release 1999).

Antipolis, S., "UE-UTRAN Radio Interface Protocol Architecture; Stage 2;" European Telecommunications Standards Institute, UMTS YY.01, V1.0.0, Dec. 1998, pp. 1-39.

Antipolis, S., UMTS Terrestrial Radio Access Network (UTRAN); UTRA FDD; (UMTS XX.03 V1.3.1), European Telecommunications Standards Institute, Feb. 1999, pp. 1-23.

* cited by examiner

Fig. 5A(1) — 120A(1)

CELL TOPOLOGY TABLE

| CELL | NEIGHBORING CELL(S) | FILTERING RULE FOR CELL: ALLOWED SGs |
|---|---|---|
| $C_{2-1}$ | $C_{1-2}, C_{3-1}, C_{3-2}, C_{2-2}$ | ALLOW: SG1, SG2 |
| $C_{2-2}$ | $C_{2-1}, C_{3-2}$ | ALLOW: SG1, SG2 |
| $C_{1-2}$ | | ALLOW: SG1, SG2 |
| $C_{3-1}$ | | ALLOW: SG1 |
| $C_{3-2}$ | | ALLOW: SG1 |

Fig. 5B(1) — 120B(1)

CELL TOPOLOGY TABLE

| CELL | NEIGHBORING CELL(S) | FILTERING RULE FOR CELL: DISALLOWED SGs |
|---|---|---|
| $C_{2-1}$ | $C_{1-2}, C_{3-1}, C_{3-2}, C_{2-2}$ | DISALLOW: ... |
| $C_{2-2}$ | $C_{2-1}, C_{3-2}$ | DISALLOW: ... |
| $C_{1-2}$ | | DISALLOW: ... |
| $C_{3-1}$ | | DISALLOW: SG2 |
| $C_{3-2}$ | | DISALLOW: SG2 |

Fig. 5C(1) — 120C(1)

CELL TOPOLOGY TABLE

| CELL | NEIGHBORING CELL(S) | FILTERING RULE FOR CELL: ALLOWED SBs | |
|---|---|---|---|
| $C_{2-1}$ | $C_{1-2}, C_{3-1}, C_{3-2}, C_{2-2}$ | BITMAP: SG1 | SG2 |
| $C_{2-2}$ | $C_{2-1}, C_{3-2}$ | BITMAP: SG1 | SG2 |
| $C_{1-2}$ | | BITMAP: SG1 | SG2 |
| $C_{3-1}$ | | BITMAP: SG1 | SG2 |
| $C_{3-2}$ | | BITMAP: SG1 | SG2 |

Fig. 5D(1) — 120D(1)

CELL TOPOLOGY TABLE

| CELL | NEIGHBORING CELL(S) | FILTERING RULE FOR CELL: DISALLOWED SGs | |
|---|---|---|---|
| $C_{2-1}$ | $C_{1-2}, C_{3-1}, C_{3-2}, C_{2-2}$ | BITMAP: SG1 | SG2 |
| $C_{2-2}$ | $C_{2-1}, C_{3-2}$ | BITMAP: SG1 | SG2 |
| $C_{1-2}$ | | BITMAP: SG1 | SG2 |
| $C_{3-1}$ | | BITMAP: SG1 | SG2 |
| $C_{3-2}$ | | BITMAP: SG1 | SG2 |

Fig. 5A(2) — 120A(2)

CELL TOPOLOGY TABLE

| CELL | NEIGHBORING CELL(S) | FILTERING RULE FOR CELL: ALLOWED IMSI OR PLMNid |
|---|---|---|
| $C_{2-1}$ | $C_{1-2}, C_{3-1}, C_{3-2}, C_{2-2}$ | IMSI->OP1, OP2 |
| $C_{2-2}$ | $C_{2-1}, C_{3-2}$ | IMSI->OP1, OP2 |
| $C_{1-2}$ |  | IMSI->OP1, OP2 |
| $C_{3-1}$ |  | IMSI->OP1 |
| $C_{3-2}$ |  | IMSI->OP1 |

Fig. 5B(2) — 120B(2)

CELL TOPOLOGY TABLE

| CELL | NEIGHBORING CELL(S) | FILTERING RULE FOR CELL: DISALLOWED IMSI OR PLMNid |
|---|---|---|
| $C_{2-1}$ | $C_{1-2}, C_{3-1}, C_{3-2}, C_{2-2}$ | IMSI->... |
| $C_{2-2}$ | $C_{2-1}, C_{3-2}$ | IMSI->... |
| $C_{1-2}$ |  | IMSI->... |
| $C_{3-1}$ |  | IMSI->OP2 |
| $C_{3-2}$ |  | IMSI->OP2 |

Fig. 5C(2) — 120C(2)

CELL TOPOLOGY TABLE

| CELL | NEIGHBORING CELL(S) | FILTERING RULE FOR CELL: ALLOWED IMSI OR PLMNid | | |
|---|---|---|---|---|
| $C_{2-1}$ | $C_{1-2}, C_{3-1}, C_{3-2}, C_{2-2}$ | BITMAP: | OP1 | OP2 |
| $C_{2-2}$ | $C_{2-1}, C_{3-2}$ | BITMAP: | OP1 | OP2 |
| $C_{1-2}$ |  | BITMAP: | OP1 | OP2 |
| $C_{3-1}$ |  | BITMAP: | OP1 | OP2 |
| $C_{3-2}$ |  | BITMAP: | OP1 | OP2 |

Fig. 5D(2) — 120D(2)

CELL TOPOLOGY TABLE

| CELL | NEIGHBORING CELL(S) | FILTERING RULE FOR CELL: DISALLOWED IMSI OR PLMNid | | |
|---|---|---|---|---|
| $C_{2-1}$ | $C_{1-2}, C_{3-1}, C_{3-2}, C_{2-2}$ | BITMAP: | OP1 | OP2 |
| $C_{2-2}$ | $C_{2-1}, C_{3-2}$ | BITMAP: | OP1 | OP2 |
| $C_{1-2}$ |  | BITMAP: | OP1 | OP2 |
| $C_{3-1}$ |  | BITMAP: | OP1 | OP2 |
| $C_{3-2}$ |  | BITMAP: | OP1 | OP2 |

Fig. 6A

| NEIGHBORING CELL 1 (302-6A₁) | FILTERING RULE FOR NEIGHBORING CELL 1 (300-6A₁) | ... | NEIGHBORING CELL J (302-6A_J) | FILTERING RULE FOR NEIGHBORING CELL J (300-6A_J) |

Fig. 6B

| HEADER (NUMBER OF GROUPS) | LIST OF GROUP 1 CELLS (302-6B₁) | FILTERING RULE FOR GROUP 1 (300-6B₁) | ... | LIST OF GROUP N CELLS (302-6B_N) | FILTERING RULE FOR GROUP N (300-6B_N) |

Fig. 6C

| NEIGHBORING CELL 1 FOR UE 30₁ (702-6C₁) | FILTERING RULE FOR NEIGHBORING CELL 1 (700-6C₁) | TAG FOR FILTERING RULE (704-6C₁) | ... | NEIGHBORING CELL J FOR UE 30₁ (702-6C_J) | FILTERING RULE FOR NEIGHBORING CELL J (700-6C_J) | TAG FOR FILTERING RULE (704-6C_J) |

Fig. 6D

| NEIGHBORING CELL 1 (702-6D₁) | TAG FOR FILTERING RULE (704-6D₁) | FILTERING RULE FOR NEIGHBORING CELL 1 (700-6D₁) | ... | NEIGHBORING CELL K (702-6D_K) | FILTERING RULE FOR NEIGHBORING CELL K (700-6D_K) |

TRANSMISSION OF FILTERING/FILTERED INFORMATION OVER THE IUR INTERFACE

This application is a continuation of U.S. patent application Ser. No. 09/932,447 filed Aug. 20, 2001 now U.S. Pat. No. 7,184,710 which is related to U.S. Provisional Patent Application No. 60/268,065, filed Feb. 13, 2001, entitled "Handover In A Shared Radio Access Network Environment Using Subscriber Dependent Neighbor Cell Lists", all of which are incorporated herein by reference in their entirety.

BACKGROUND

1. Field of the Invention

This invention pertains to telecommunications, and particularly to the structure and operation of shared telecommunication networks.

2. Related Art and Other Considerations

In a typical cellular radio system, mobile user equipment units (UEs) communicate via a radio access network (RAN) to one or more core networks. The user equipment units (UEs) can be mobile stations such as mobile telephones ("cellular" telephones) and laptops with mobile termination, and thus can be, for example, portable, pocket, hand-held, computer-included, or car-mounted mobile devices which communicate voice and/or data with radio access network.

The radio access network (RAN) covers a geographical area which is divided into cell areas, with each cell area being served by a base station. A cell is a geographical area where radio coverage is provided by the radio base station equipment at a base station site. Each cell is identified by a unique identity, which is broadcast in the cell. The base stations communicate over the air interface (e.g., radio frequencies) with the user equipment units (UE) within range of the base stations. In the radio access network, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core networks.

One example of a radio access network is the Universal Mobile Telecommunications (UMTS) Terrestrial Radio Access Network (UTRAN). The UMTS is a third generation system which in some respects builds upon the radio access technology known as Global System for Mobile communications (GSM) developed in Europe. UTRAN is essentially a radio access network providing wideband code division multiple access (WCDMA) to user equipment units (UEs). The Third Generation Partnership Project (3GPP) has undertaken to evolve further the UTRAN and GSM-based radio access network technologies.

As those skilled in the art appreciate, in W-CDMA technology a common frequency band allows simultaneous communication between a user equipment unit (UE) and plural base stations. Signals occupying the common frequency band are discriminated at the receiving station through spread spectrum CDMA waveform properties based on the use of a high speed, pseudo-noise (PN) code. These high speed PN codes are used to modulate signals transmitted from the base stations and the user equipment units (UEs). Transmitter stations using different PN codes (or a PN code offset in time) produce signals that can be separately demodulated at a receiving station. The high speed PN modulation also allows the receiving station to advantageously generate a received signal from a single transmitting station by combining several distinct propagation paths of the transmitted signal. In CDMA, therefore, a user equipment unit (UE) need not switch frequency when handoff of a connection is made from one cell to another. As a result, a destination cell can support a connection to a user equipment unit (UE) at the same time the origination cell continues to service the connection. Since the user equipment unit (UE) is always communicating through at least one cell during handover, there is no disruption to the call. Hence, the term "soft handover." In contrast to hard handover, soft handover is a "make-before-break" switching operation.

The Universal Mobile Telecommunications (UMTS) Terrestrial Radio Access Network (UTRAN) accommodates both circuit switched and packet switched connections. In this regard, in UTRAN the circuit switched connections involve a radio network controller (RNC) communicating with a mobile switching center (MSC), which in turn is connected to a connection-oriented, external core network, which may be (for example) the Public Switched Telephone Network (PSTN) and/or the Integrated Services Digital Network (ISDN). On the other hand, in UTRAN the packet switched connections involve the radio network controller communicating with a Serving GPRS Support Node (SGSN) which in turn is connected through a backbone network and a Gateway GPRS support node (GGSN) to packet-switched networks (e.g., the Internet, X.25 external networks). MSCs and GSNs are in contact with a Home Location Register (HRL), which is a database of subscriber information.

There are several interfaces of interest in the UTRAN. The interface between the radio network controllers (RNCs) and the core network(s) is termed the "Iu" interface. The interface between a radio network controller (RNC) and its base stations (BSs) is termed the "Iub" interface. The interface between the user equipment unit (UE) and the base stations is known as the "air interface" or the "radio interface" or "Uu interface". In some instances, a connection involves both a Serving or Source RNC (SRNC) and a target or drift RNC (DRNC), with the SRNC controlling the connection but with one or more diversity legs of the connection being handling by the DRNC. An Inter-RNC transport link can be utilized for the transport of control and data signals between Source RNC and a Drift or Target RNC, and can be either a direct link or a logical link as described, for example, in International Application Number PCT/US94/12419 (International Publication Number WO 95/15665). An interface between radio network controllers (e.g., between a Serving RNC [SRNC] and a Drift RNC [DRNC]) is termed the "Iur" interface.

The radio network controller (RNC) controls the UTRAN. In fulfilling its control role, the RNC manages resources of the UTRAN. Such resources managed by the RNC include (among others) the downlink (DL) power transmitted by the base stations; the uplink (UL) interference perceived by the base stations; and the hardware situated at the base stations.

Those skilled in the art appreciate that, with respect to a certain RAN-UE connection, an RNC can either have the role of a serving RNC (SRNC) or the role of a drift RNC (DRNC). If an RNC is a serving RNC (SRNC), the RNC is in charge of the connection with the user equipment unit (UE), e.g., it has full control of the connection within the radio access network (RAN). A serving RNC (SRNC) is connected to the core network. On the other hand, if an RNC is a drift RNC (DRNC), its supports the serving RNC (SRNC) by supplying radio resources (within the cells controlled by the drift RNC (DRNC)) needed for a connection with the user equipment unit (UE). A system which includes the drift radio network controller (DRNC) and the base stations controlled over the Iub Interface by the drift radio network controller (DRNC) is herein referenced as a DRNC subsystem or DRNS. An RNC is said to be the Controlling RNC (CRNC) for the base stations connected to it by an Iub interface. This CRNC role is not UE specific. The CRNC is, among other things, responsible for handling radio resource management for the cells in the base stations connected to it by the Iub interface.

The UTRAN interfaces (Iu, Iur and Iub) have two planes, namely, a control plane (CP) and a user plane (UP). In order to control the UTRAN, the radio network application in the different nodes communicate by using the control plane protocols. The RANAP is a control plane protocol for the Iu interface; the RNSAP is a control plane protocol for the Iur interface; and NBAP is a control plane protocol for the Iub interface. The control plane protocols are transported over reliable signaling bearers. The transport of data received/transmitted on the radio interface occurs in the user plane (UP). In the user plane, the data is transported over unreliable transport bearers. The serving radio network controller (SRNC) is responsible for establishing the necessary transport bearers between the serving radio network controller (SRNC) and the drift radio network controller (DRNC).

It has recently been contemplated that two or more operators can share network infrastructure, e.g., share a UTRAN in a particular geographical area. In the shared network all of the UTRAN resources are shared, e.g. RNCs, node-Bs, cells, etc, and can be used equally by subscribers of both sharing operators. Using shared networks, operators can reduce the cost of network build-out.

When user equipment units are leaving the coverage area of the shared network (e.g., leaving a shared network cell), it is likely that each operator will require that their own subscribers handover to their own home network. If, however, cells from both operators home networks neighbor the shared network cell, a problem of possibly handing over the user equipment unit to the wrong network when leaving the shared network coverage area must be addressed.

This problem can be solved by a technique which includes filtering out the cells that are not possible/permitted (or not preferred) for handover for a given user equipment unit, and only sending the list of allowed neighbor cells to the user equipment unit, so that the user equipment unit can measure on those cells, and send the results to the RNC. The RNC will then choose a cell to which to handover to based on the measured results. This technique will herein be called "selective handover".

The cell filtering is performed based on the international mobile subscriber identity (IMSI) of the user equipment unit. The international mobile subscriber identity (IMSI) is stored in the RNC for each connected mode user equipment unit. The international mobile subscriber identity (IMSI) is received in the RNC from the core network (CN) in a RANAP COMMON ID message when a radio resource control (RRC) connection is setup. The international mobile subscriber identity (IMSI) [which comprises not more than fifteen digits] comprises three components: a mobile country code (MCC) [three digits]; a mobile network code (MNC)[two or three digits]; and a mobile subscriber identification number (MSIN). The home-public land mobile network (HPLMN) id [HPLMNid] of the user equipment unit can be extracted from the international mobile subscriber identity (IMSI). In this regard, the HPLMNid of the user equipment unit is the mobile country code (MCC)+the mobile network code (MNC). The HPLMN id can be compared against a filtering rule for a given neighbor cell in order to check whether the user equipment unit should be allowed to handover to that cell.

The filtering rule can be as simple as comparing the PLMNid of the neighbor cell itself to the HPLMNid of the user equipment unit. If they are the same, only cells from the current PLMN, and from the PLMN equal to the HPLMN of the user equipment unit, are included in the measurement list sent to the user equipment unit.

The "measurement list" is the list of cells that the system (e.g., network) sends the user equipment unit, in order that the user equipment unit should perform measurements (e.g., signal strength measurements) for these cells. The measurement list includes both cells in the active set and cells in the monitored set. The "active set" is comprised of cells involved in soft/softer handover (macro diversity) for which the UTRAN requires the UE to perform measurements (the active set is defined in 3GPP). The "monitored set" comprises cells, which although not included in the active set, are required by the UTRAN for the user equipment unit to perform measurements, i.e., cells in the neighbor set that the user equipment unit is required to measure on (Defined in 3GPP). The "neighbor set" is the union of the neighbor cells of the cells in the active set with exclusion of the cells in the active set. The "listed set" is the sum of the active set and the monitored set, i.e., all cells that UTRAN requires the user equipment unit to measure on. The "detected Set" comprises cells that the user equipment unit can detect, that are included neither in the active set or the monitored set.

The user equipment unit reports to the SRNC the signal strength for the cells included in the measurement list. The SRNC analyzes the reported measurements and may perform a handover for cells whose signal strength measurements satisfy criteria of the SRNC. Performing a handover in this context may involve, e.g., setting up a radio link or connection leg in a diversity situation, i.e., adding a new radio link to the active set for the user equipment unit.

The selective handover function can also be required in other cases, for example in the geographical split solution to shared networks, where the operators cover different areas of a country, but allow other operators to use their network through roaming agreements. In some cases the geographically split networks will overlap in coverage, and again each operator will require their own subscribers to return to their own home network. In this regard, see (for example) U.S. Patent Application Ser. No. 60/301,442, filed Jun. 29, 2001, entitled "Partial Support of Mobility Between Radio Access Networks", which is incorporated herein by reference in its entirety.

The filtering for selective handover is best performed in the serving radio network controller (SRNC) where the radio resource control (RRC) connection for a user equipment unit is terminated, and where the measurement list of the user equipment unit is handled. However, unfortunately the serving radio network controller (SRNC) only knows the filtering rules (for example which PLMNs are allowed, and which are not) for cells in the SRNC (e.g., cells controlled by the SRNC), and those cells in the DRNC that the SRNC has configured as external cells. When a user equipment unit hands over from a cell in an SRNC to a target cell controlled by a DRNC, the SRNC receives information on neighboring cells adjacent the new DRNC cell (i.e., the new target cell) from the DRNC. Some of these neighboring cells may be defined already as neighbor cells in the SRNC, but quite possibly some will not already be so defined, as they may be "neighbors" to the neighbor cells already defined in the SRNC.

At this juncture of having completed the handover to the target cell, the SRNC would like to send a filtered measurement list to the UE over the RRC connection, telling the UE which cells to measure handover criteria on (e.g., signal strength or some other criteria). Desirably the filtered list would include whichever of the new neighbor cells received from the DRNC are permitted for the user equipment unit. However the SRNC does not know the filtering rules for the DRNC neighbor cells.

What is needed, therefore, and an object of the present invention, is a technique to facilitate filtering of cells for use in a measurement list in conjunction with a selective handover situation from a shared network.

BRIEF SUMMARY OF THE INVENTION

In accordance with various embodiments of the invention, a drift radio network controller (DRNC) transmits to a serving radio network controller (SRNC) either (1) a filtering rule for a candidate cell [so that the serving radio network controller (SRNC) can generate a measurement list for a user equipment unit having a connection controlled by the serving radio network controller (SRNC)], or (2) a list of cells qualifying [according to filtering rules stored at and applied by the drift radio network controller (DRNC)] for inclusion in the measurement list for the user equipment unit. The filtering rule provides criteria useful for determining whether the candidate cell qualifies for inclusion in the measurement list of cells for the user equipment unit. If the candidate cell is a shared cell or cell for which the user equipment unit otherwise has permission for usage, the candidate cell qualifies for inclusion in the measurement list for the user equipment unit. On the other hand, if the candidate cell is an unshared cell for which the user equipment unit has no permission for usage, the candidate cell does not qualify for inclusion in the measurement list for the user equipment unit.

In one mode of the invention, the drift radio network controller (DRNC) transmits the filtering rule for the candidate cell in an Iur interface message to the serving radio network controller (SRNC). In a certain scenario of this mode, the filtering rule is transmitted after the user equipment unit has been handed over to a target cell controlled by the drift radio network controller (DRNC). In this scenario, the candidate cell is a neighboring cell for the target cell.

The filtering rule itself can take various forms. For example, the filtering rule can comprise a list of subscriber groups which are allowed in the candidate cell (a subscriber groups comprising one or more IMSI-PLMNs), or a list of PLMN identifiers or IMSI ranges which are allowed for the candidate cell. Alternatively, the filtering rule can comprise a list of subscriber groups (or PLMN identifiers or IMSI ranges) which are not allowed for the candidate cell. As yet a further alternative, the filtering rule can comprise a bitmap with a predetermined position of the bitmap corresponding to a subscriber group (or PLMN identifier or an IMSI range).

The filtering rules can either be stored per cell or per cell relation, and can be stored, e.g., in a cell topology table at the drift radio network controller (DRNC). Should the filtering rule(s) to be transmitted in the filtering rule-bearing Iur message not be expressed in a format desired by the serving radio network controller (SRNC), the filtering rule(s) can be converted to the desired format by a filtering rule format translator.

Typically the drift radio network controller (DRNC) transmits to the serving radio network controller (SRNC) filtering rules for plural candidate cells. In such case, various transmission economizing features of the invention may be employed. As a first such transmission economizing feature, the drift radio network controller (DRNC) can associate a group of plural candidate cells having a common filtering rule, and transmit the common filtering rule to the serving radio network controller (SRNC) only once rather than for each candidate cell in the group.

As a second such transmission economizing feature, in conjunction with a first user equipment unit the drift radio network controller (DRNC) transmits the filtering rule for the candidate cell to the serving radio network controller (SRNC). Subsequently, for a second user equipment unit for which the candidate cell is possibly applicable, the filtering rule for the candidate cell is not transmitted so long as the filtering rule for the candidate cell remains unchanged. Thereafter, the measurement list of cells is transmitted to the second user equipment unit by the serving radio network controller (SRNC) on the basis of the filtering rule for the candidate cell as obtained from the drift radio network controller (DRNC) in conjunction with the first user equipment unit.

In accordance with a third example transmission economizing feature, the format of a filtering rule-bearing Iur message includes a filtering rule identification tag which refers to the filtering rule for a specific candidate cell, rather than for the collective filtering rule field associated with an earlier user equipment unit (UE). Therefore, a subsequent filtering rule-bearing Iur message (for the same or a different user equipment unit) can employ the filtering rule identification tag of a candidate cell which was the subject of a prior filtering rule-bearing Iur message, so long as the filtering rule for candidate cell has not been changed.

In a fourth example transmission economizing feature the filtering rule identification tag is employed to refer to a list of neighboring cells, rather than to an entire message per se or to a specific single neighboring field.

Using the second, third, and fourth transmission economizing features, the filtering rule for the candidate cell(s) (or groups of candidate cells) are not transmitted so long as the respective filtering rule(s) remain unchanged. As an adjunct to the second, third, and fourth transmission economizing features, the serving radio network controller (SRNC) can apprise the drift radio network controller (DRNC) of the serving radio network controller's (SRNC) current version of the filtering rule for the candidate cell. The drift radio network controller (DRNC) determines whether the filtering rule for a candidate cell is unchanged relative to the serving radio network controller's (SRNC) current version of the filtering rule.

In another mode of the invention, the drift radio network controller (DRNC) may itself apply the filtering rule to determine whether the candidate cell qualifies for the measurement list. As in other modes, the filtering rule provides criteria for determining whether the candidate cell qualifies for inclusion in a measurement list of cells for the user equipment unit. In the drift radio network controller (DRNC)-filtering rule applying mode, the drift radio network controller (DRNC) transmits to the serving radio network controller (SRNC) a list of cells (e.g., a filtered list) suitable for inclusion in the measurement list as determined by the drift radio network controller's application of the filtering rule. The drift radio network controller (DRNC) may optionally also transfer the filtering rule for the candidate cell to the serving radio network controller (SRNC). The drift radio network controller (DRNC)-filtering rule applying mode requires that the drift radio network controller (DRNC) know the international mobile subscriber identity (IMSI) for the user equipment unit.

In yet another mode of implementing the present invention, the serving radio network controller (SRNC) may set up a radio link with the user equipment unit via a selected cell controlled by the drift radio network controller (DRNC), and possibly other radio links with the user equipment unit as well. At the time of connection setup, the international mobile subscriber identity (IMSI) of the user equipment unit may not yet be known by the SRNC. As in the first mode, the drift radio network controller (DRNC) transmits to the serving radio network controller (SRNC) a filtering rule for a candidate cell as well as a list of neighboring cells. However, not yet knowing the IMSI for the user equipment unit, the serving radio network controller (SRNC) transmits to the user equipment unit an unfiltered measurement list message which includes all the neighboring cells (e.g., the cells which are adjacent the cell in which the user equipment unit has an established radio link). Subsequently, upon the serving radio network controller (SRNC) learning, e.g., from a core network, the international mobile subscriber identity (IMSI) for the user equipment unit, the serving radio network controller (SRNC) can use the international mobile subscriber identity (IMSI) to check at least one of the following: (1) whether the measurement list for the user equipment unit should be updated to delete the candidate cell; and (2) whether a radio link for the selected cell should be removed. In a case in which plural radio links are initially established by the SRNC with the user equipment unit, and in which upon subsequent receipt of the international mobile subscriber identity (IMSI) the serving radio network controller (SRNC) determines that all of the radio links are not permitted, the serving radio network controller (SRNC) can prudently move the user equipment unit to a permitted cell before tearing down the non-permitted radio links. This sequence of events is preferable to just dropping the call if the serving radio network controller (SRNC) were to notice that the user equipment unit only has radio links in unallowed cells.

In yet another mode of the invention, in a hybrid operation both the serving radio network controller (SRNC) and the drift radio network controller (DRNC) are capable of applying the filtering rule for the candidate cell. In a first example scenario of this hybrid mode, the drift radio network controller (DRNC) transmits the filtering rule for a candidate cell in an Iur message to the serving radio network controller (SRNC) as in the first mode. The filtering rule can be transmitted, for example, after the user equipment unit has been handed over to a target cell controlled by the drift radio network controller (DRNC) [the candidate cell being a neighboring cell for the target cell]. Thereafter, the international mobile subscriber identity (IMSI) of the user equipment unit is transmitted to the drift radio network controller (DRNC). Subsequently, e.g., upon handover to the candidate cell, and since it knows the IMSI of the user equipment unit, the drift radio network controller (DRNC) itself can become involved in the filtering should, for example, another candidate cell be considered for inclusion in the measurement list. For this another candidate cell, the drift radio network controller (DRNC) can apply the filtering rule for the another candidate cell, and then apprise the serving radio network controller (SRNC) whether the another candidate cell should be included in the measurement list. In fact, the drift radio network controller (DRNC) may transmit to the serving radio network controller (SRNC) a list of one or more qualifying cells (including the another candidate cell or not, as appropriate) for inclusion in the measurement list.

In a second example scenario of this hybrid mode, upon receiving the IMSI the serving radio network controller (SRNC) essentially immediately sends the IMSI of the user equipment unit to the drift radio network controller (DRNC) and permits the drift radio network controller (DRNC) to invoke its cell filter to apply the filtering rules, rather than performing the filtering at the serving radio network controller (SRNC). The cell filtering function of the drift radio network controller (DRNC) prepares a filtered cell list for inclusion in a filtered list-bearing Iur message which is transmitted to the serving radio network controller (SRNC). The filtered cell list is included in a new measurement list message which is transmitted to the user equipment unit (e.g., as a radio resource control (RRC) message). In addition, if in the second scenario of the hybrid mode the drift radio network controller (DRNC) finds that a radio link(s) for the connection with the user equipment unit was impermissibly set up one or more a "not allowed" cell(s) for that user equipment unit, then the drift radio network controller (DRNC) releases such unallowed radio link(s).

In accordance with one aspect of the invention, the hybrid mode can be made optional or selectively invoked. In this regard, the serving radio network controller (SRNC) can send a permission message to the drift radio network controller (DRNC) whereby the drift radio network controller (DRNC) is given permission to use the filtering rule.

In the hybrid mode and the DRNC-filtering rule applying mode, after the drift radio network controller (DRNC) has taken over the process of filtering cells for use in the measurement list, only those neighbor cells to which the UE can legitimately handover to are returned to the serving radio network controller (SRNC) in the filtered list-bearing Iur message. Moreover, whether the filtering rules are to be included in the filtered list-bearing Iur message can be prescribed by a parameter sent from the serving radio network controller (SRNC) to the drift radio network controller (DRNC) in an appropriate Iur message.

In its various aspects, the present invention includes not only the transmission and/or application of the filtering rule by the drift radio network controller (DRNC), but also a network in which the transmission and/or application of the filtering rule occurs as well as the particular drift radio network controller (DRNC) nodes which perform the transmission and/or application of the filtering rule.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 5A(1)-FIG. 5D(1) and FIG. 5A(2)-FIG. 5D(2) are diagrammatic views of alternate example configurations of a cell topology table included in the cell filtering function of the present invention.

FIG. 6A-FIG. 6F are diagrammatic views of example filtering rule-bearing Iur messages of the present invention, with FIG. 6B-FIG. 6F showing certain filtering rule-bearing Iur message transmission economizing features.

DETAILED DESCRIPTION OF THE INVENTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well-known devices, circuits, and methods are omitted so as not to obscure the description of the present invention with unnecessary detail. Moreover, individual function blocks are shown in some of the figures. Those skilled in the art will appreciate that the functions may be implemented using individual hardware circuits, using software functioning in conjunction with a suitably programmed digital microprocessor or general purpose computer, using an application specific integrated circuit (ASIC), and/or using one or more digital signal processors (DSPs).

Figure 1:
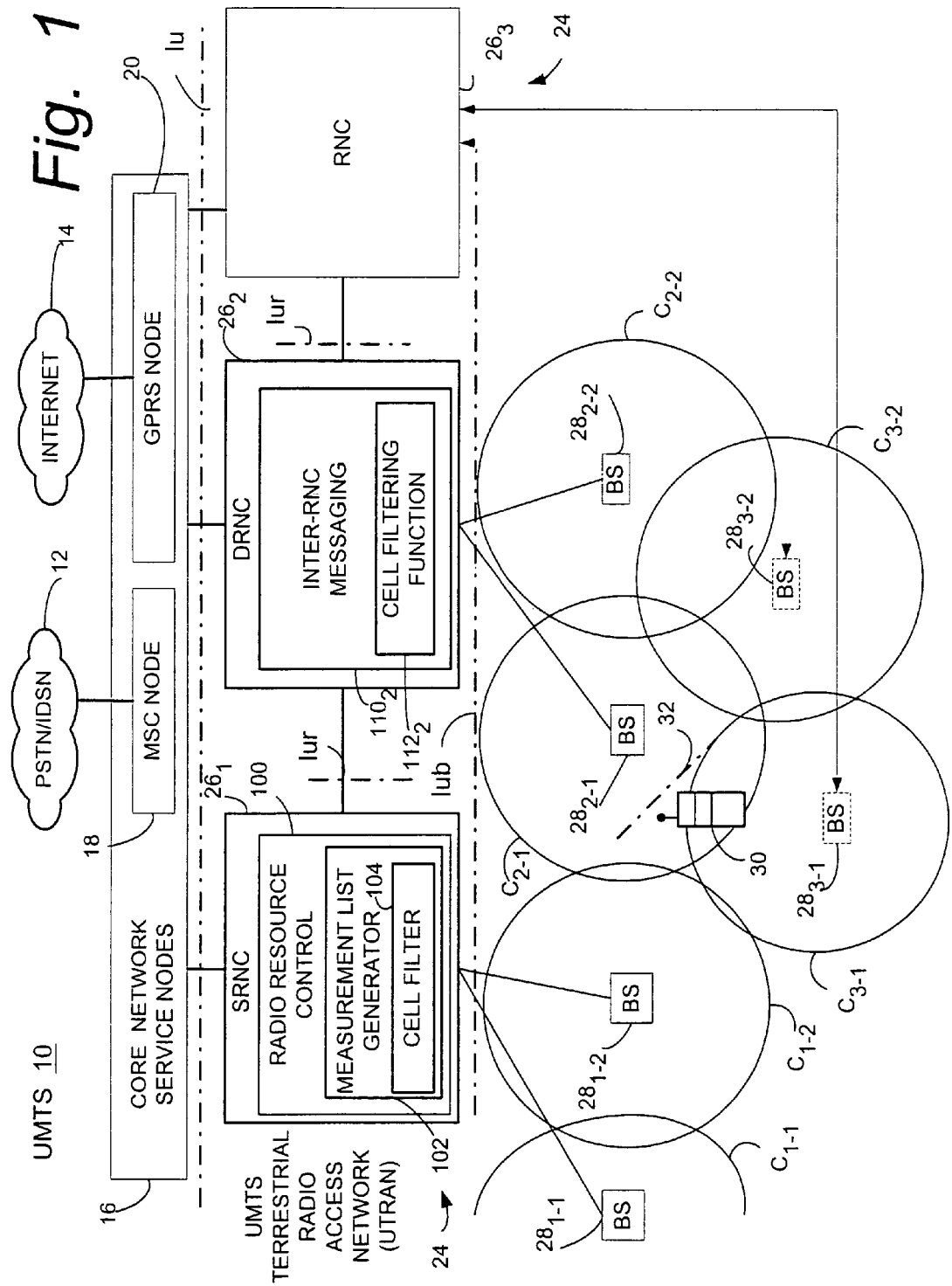
FIG. 1 is diagrammatic view of example mobile communications system including a cell filtering function of the present invention.

The present invention is described in the non-limiting, example context of a universal mobile telecommunications (UMTS) 10 shown in FIG. 1. A representative, connection-oriented, external core network, shown as a cloud 12 may be for example the Public Switched Telephone Network (PSTN) and/or the Integrated Services Digital Network (ISDN). A representative, connectionless external core network shown as a cloud 14, may be for example the Internet. Both core networks are coupled to their corresponding service nodes 16. The PSTN/ISDN connection-oriented network 12 is connected to a connection-oriented service node shown as a Mobile Switching Center (MSC) node 18 that provides circuit-switched services. The Internet connectionless-oriented network 14 is connected to a General Packet Radio Service (GPRS) node 20 tailored to provide packet-switched type services which is sometimes referred to as the serving GPRS service node (SGSN).

Each of the core network service nodes 18 and 20 connects to one or more radio access networks (RANs) over an interface referred to as the Iu interface. In the illustrated example, the radio access network (RAN) is more specifically known as a UMTS Terrestrial Radio Access Network (UTRAN) 24. The UTRAN 24 includes one or more radio network controllers (RNCs) $26_1$ only three such RNCs $26_1$, $26_2$, and $26_3$ being shown by way of example in FIG. 1. Each radio network controller (RNC) 26 controls one or more base stations (BS) 28. Those skilled in the art will also appreciate that a base station is sometimes also referred to in the art as a radio base station, a node B, or B-node.

Each radio network controller (RNC) 26 is connected to a plurality of base stations (BS) 28. For example, and again for sake of simplicity, two base station nodes are shown connected to each radio network controller $26_1$. In this regard, RNC $26_1$ serves base station $28_{1-1}$ and base station $28_{1-2}$, while RNC $26_2$ serves base station $28_{2-1}$ and base station $28_{2-2}$ and RNC $26_3$ serves base station $28_{3-1}$ and base station $28_{3-2}$ It will be appreciated that a different number of base stations can be served by each radio network controller, and that radio network controllers need not serve the same number of base stations. Moreover, although not necessarily illustrated in FIG. 1, a radio network controller can be connected over an Iur interface to one or more other RNCs.

In the course of describing the present invention, it should be understood that the radio network controllers (RNC) $26_1$, $26_2$, and $26_3$ may be operated as a shared network (e.g., these radio network controllers and the base stations controlled are shared by one or more operators [e.g., telephone service provider companies]). Alternatively, some of the network controllers (RNC) 26 may be shared, while others are not. As a further alternative, all of the radio network controllers (RNC) $26_1$, $26_2$, and $26_3$ may be operated as an unshared network (e.g., only one operator owns both nodes). As such, the present invention applies to all kinds of handovers including the following: (1) handing over from a shared network node to the sharing operator's own RNC (e.g., handing over from a shared serving radio network controller (SRNC) to one of the operator's own drift radio network controllers (DRNC)); (2) handing over from the operator's own serving radio network controller (SRNC) node to a shared drift radio network controller (DRNC); (3) handing over from a shared serving radio network controller (SRNC) to a shared drift radio network controller (DRNC) (e.g., different operators sharing both RNCs); (4) handing over from an operator's own serving radio network controller (SRNC) to the operator's own drift radio network controller (DRNC).

In the illustrated embodiments, for sake of simplicity each base station 28 is shown as serving one cell C. The cells C shown in FIG. 1 are provided with the same subscript as their corresponding base stations (BS) 28. Each cell is represented by a circle which surrounds the respective base station. It will be appreciated by those skilled in the art, however, that a base station may serve for communicating across the air interface for more than one cell. For example, two cells may utilize resources situated at the same base station site.

A user equipment unit (UE), such as user equipment unit (UE) 30 shown in FIG. 1, communicates with one or more cells or one or more base stations (BS) 28 over a radio or air interface 32. Each of the radio interface 32, the Iu interface, the Iub interface, and the Iur interface are shown by dash-dotted lines in FIG. 1. For the particular user equipment unit (UE) 30 shown in FIG. 1, radio network controller (RNC) $26_1$ currently fulfills the role of the serving radio network controller (SRNC), while radio network controller (RNC) $26_2$ performs the role of the drift radio network controller (DRNC). Such being the case, radio network controller (RNC) $26_1$ controls the radio access connection with user equipment unit (UE) 30. One diversity leg or radio link of the connection with user equipment unit (UE) may be via a cell (such as cell $C_{1-2}$) which is controlled by radio network controller (RNC) $26_1$, while another diversity leg or radio link of the connection with processing unit 30 may be via a cell (such as cell $C_{2-1}$) which is controlled by radio network controller (RNC) $26_2$. In such case, radio network controller $26_2$ functions as a drift radio network controller (DRNC) with respect to the connection involving user equipment unit (UE) 30.

Certain advantages of the present invention will become more apparent when it is understood that all cells controlled by a given radio network controller (RNC) need not be commonly owned. For example, a first cell controlled by the given radio network controller (RNC) may be a shared cell (e.g., shared by two operators), while a second cell controlled by the same given radio network controller (RNC) may be unshared (owned by only one of the operators). As such, cells controlled by a given radio network controller (RNC) may have the same filtering rules if all cells are commonly owned. On the other hand, the cells controlled by the given radio network controller (RNC) may have differing filtering rules if not commonly owned.

Preferably, radio access is based upon Wideband, Code Division Multiple Access (WCDMA) with individual radio channels allocated using CDMA spreading codes. Of course, other access methods may be employed. WCDMA provides wide bandwidth for multimedia services and other high transmission rate demands as well as robust features like diversity handoff and RAKE receivers to ensure high quality.

In accordance with various embodiments of the invention, a drift radio network controller (DRNC) [such as radio network controller (RNC) $26_2$ of radio access network (RAN) 24 FIG. 1] sends to a serving radio network controller (SRNC) [such as radio network controller (RNC) $26_1$] either of the following: (1) a filtering rule for a candidate cell or (2) a list of cells qualifying [according to filtering rules stored at and applied by the drift radio network controller (DRNC)] for inclusion in the measurement list for the user equipment unit.

As example structure of one embodiment for implementing the present invention, the radio network controller (RNC) $26_1$ includes a radio resource control (RRC) unit or function 100. The radio resource control (RRC) unit 100 in turn comprises a measurement list generator 102. The serving radio network controller (SRNC) $26_1$ uses the measurement list generator 102 to generate a measurement list for a user equipment unit having a connection controlled by the serving radio network controller, e.g., user equipment unit (UE) 30.

The measurement list generator 102 has a cell filter 104 which utilizes a filtering rule advantageously provided to cell filter 104 of serving radio network controller (SRNC) $26_1$ by the drift radio network controller (DRNC), e.g., DRNC $26_2$. The filtering rule provides criteria useful for determining whether a candidate cell qualifies for inclusion in the measurement list of cells for the user equipment unit. If the candidate cell is a shared cell or cell for which the user equipment unit otherwise has permission for usage, the candidate cell qualifies for inclusion in the measurement list for the user equipment unit. On the other hand, if the candidate cell is a unshared cell for which the user equipment unit has no permission for usage, the candidate cell does not qualify for inclusion in the measurement list for the user equipment unit.

Example structure of the foregoing embodiment for implementing the present invention also includes an inter-RNC messaging function $110_2$ in the drift radio network controller (DRNC) $26_2$. The inter-RNC messaging function $110_2$ comprises cell filtering function $112_2$.

Figure 2:
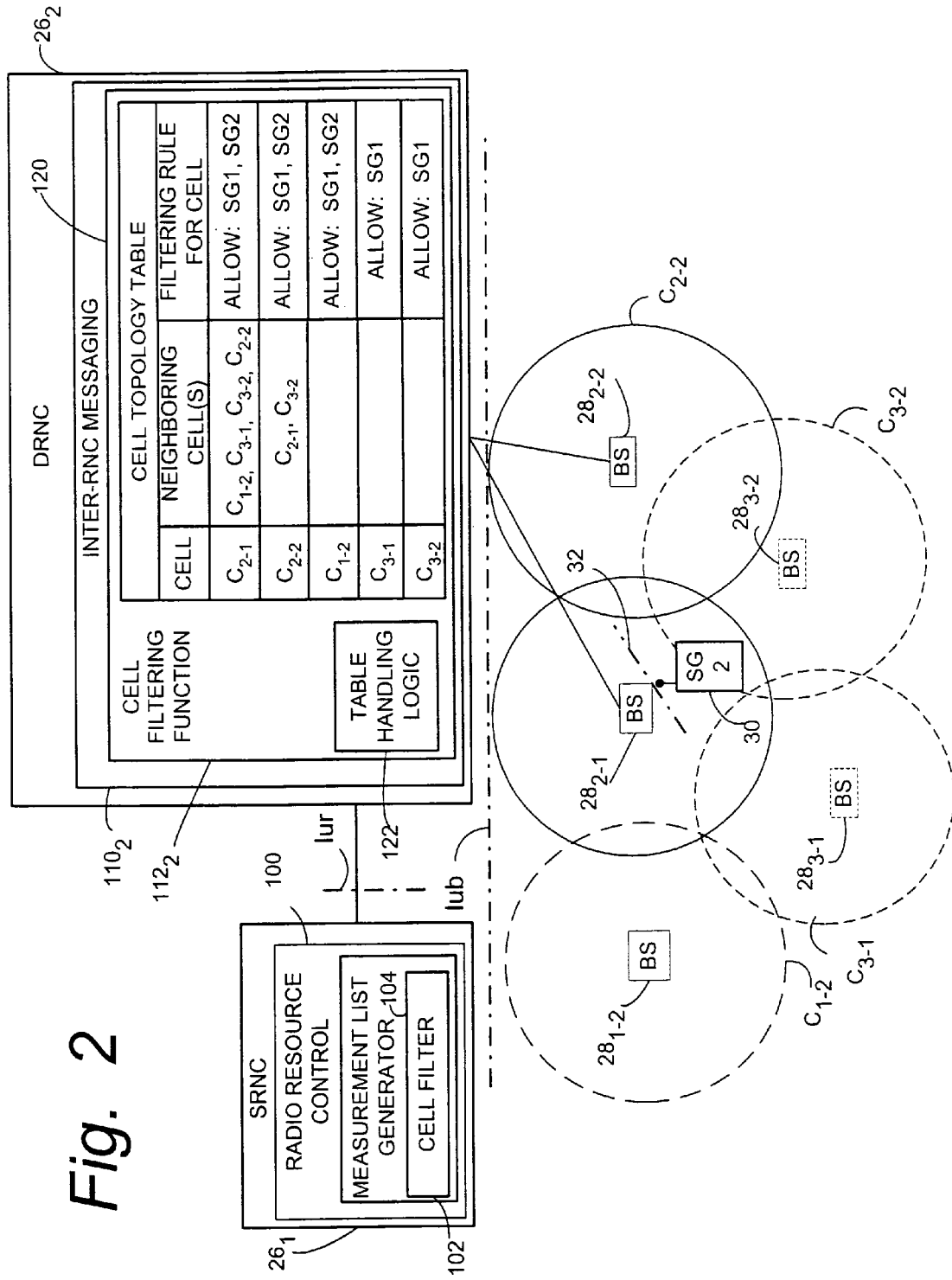
FIG. 2 is diagrammatic view of showing an example embodiment of implementation of the cell filtering function of the present invention.

Certain aspects of one example implementation of the cell filtering function $112_2$ are shown in more detail in FIG. 2. In particular, cell filtering function $112_2$ is illustrated as comprising cell topology table 120 and table handling logic 122. The cell topology table 120 can also be (and be referred to as) a cell relation table or cell relation memory. The memory for storing the filtering rules is not limited to the illustrated examples. In one illustrated example implementation, the cell topology table 120 includes a row for each cell controlled by drift radio network controller (RNC) $26_2$, as well as a row for any exterior cell (e.g., any cell which is adjacent to any of the cells controlled by drift radio network controller (RNC) $26_2$). Each row of cell topology table 120 has a first field or index field which identifies the cell characterized by or associated with remaining fields of the row. In the particular example implementation shown in FIG. 1, the cell topology table 120 has a row (and an index field) for each cell controlled by radio network controller (RNC) $26_2$ (e.g., cell $C_{2-1}$ and cell $C_{2-2}$). In addition, cell topology table 120 has a row (and index field) for each exterior cell (e.g., cell $C_{1-2}$, cell $C_{3-1}$, and cell $C_{3-2}$, all of which are adjacent (e.g., neighbor) the cells controlled by radio network controller (RNC) $26_2$). Because cell $C_{1-2}$, cell $C_{3-1}$, and cell $C_{3-2}$ are exterior cells for radio network controller (RNC) $26_2$, these cells are shown by broken lines in FIG. 2.

To the extent pertinent to the present invention, each row of the example cell topology table 120 has two fields of information which are associated with the cell of the index field of the same row (e.g., the index field cell). The first field is a list of cells which neighbor the index field cell, the second field is a filtering rule for the index field cell. Only for cells controlled by the drift radio network controller (DRNC) $26_2$ does the cell topology table 120 have content in the list of neighboring cells, since the cells which neighbor an external cell are unknown to the RNC.

In one mode of the invention, a drift radio network controller (DRNC) such as drift radio network controller (DRNC) $26_2$ transmits the filtering rule for one or more candidate cells in an Iur message to a serving radio network controller (SRNC) such as serving radio network controller (SRNC) $26_1$. One example of an Iur message is an Iur signalling message in the RNSAP protocol which is used to signal between the serving radio network controller (SRNC) and the drift radio network controller (DRNC). The RNSAP protocol terminates in the serving radio network controller (SRNC) and (on the other side) in the drift radio network controller (DRNC).

Figure 3:
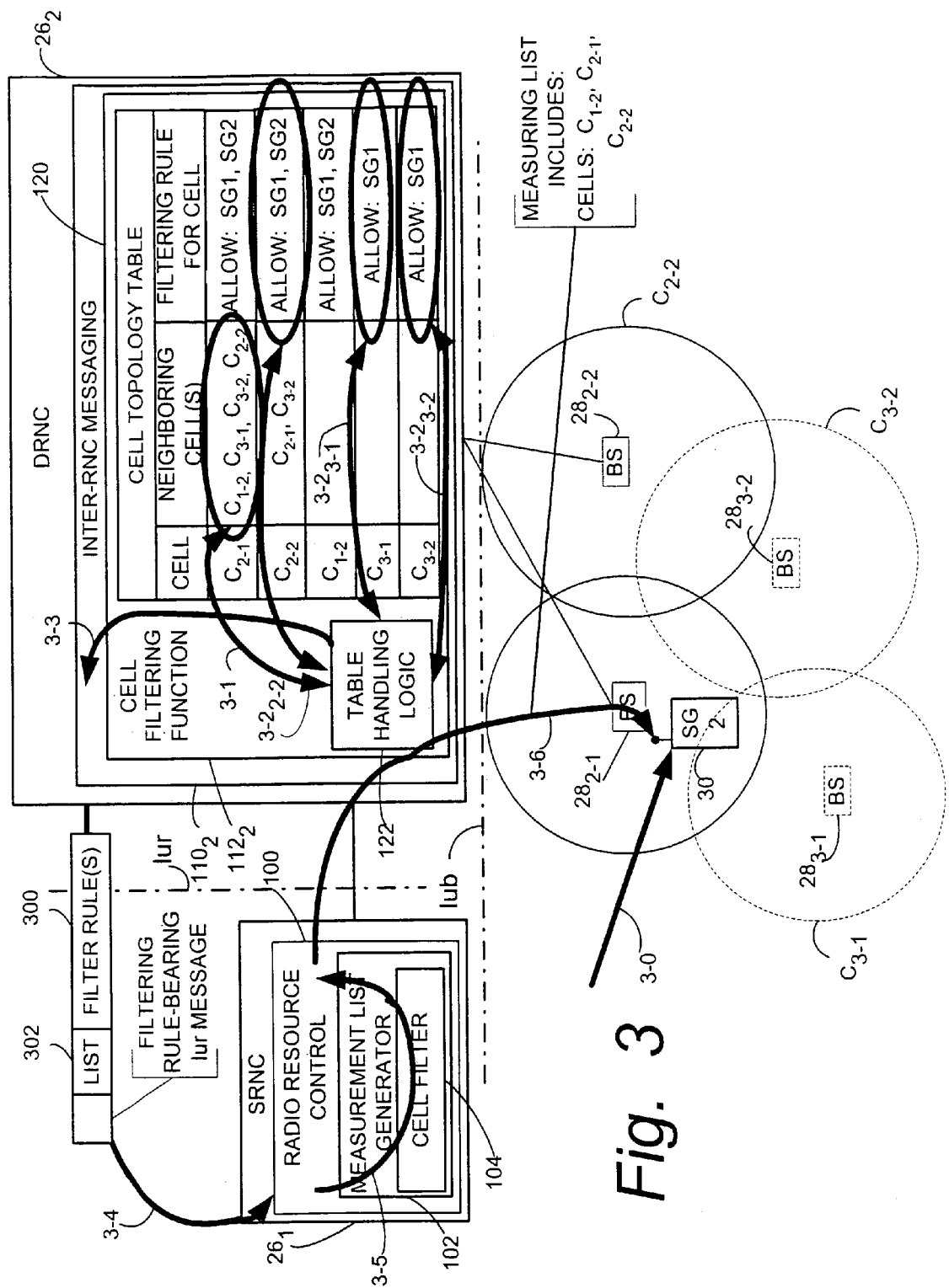
FIG. 3 and FIG. 3A are diagrammatic views illustrating scenarios of a first mode of operation of the cell filtering function of the present invention.

In a certain scenario of this mode illustrated in FIG. 3, the filtering rule is typically transmitted when the UE is in the process of being handed over to a target cell controlled by the drift radio network controller (DRNC). For example, in the implementation of this scenario as shown in FIG. 1, user equipment unit (UE) 30 has been handed over to a target cell (cell $C_{2-1}$) controlled by the drift radio network controller (DRNC) $26_2$. Arrow 3-0 in FIG. 3 depicts travel of user equipment unit (UE) 30 toward and into cell $C_{2-1}$, which prompts the hand over of the connection to target cell $C_{2-1}$. A candidate cell for the user equipment unit is then any cell which neighbors the target cell (e.g., any cell which neighbors target cell $C_{2-1}$ in the FIG. 3 example scenario).

Figure 4:
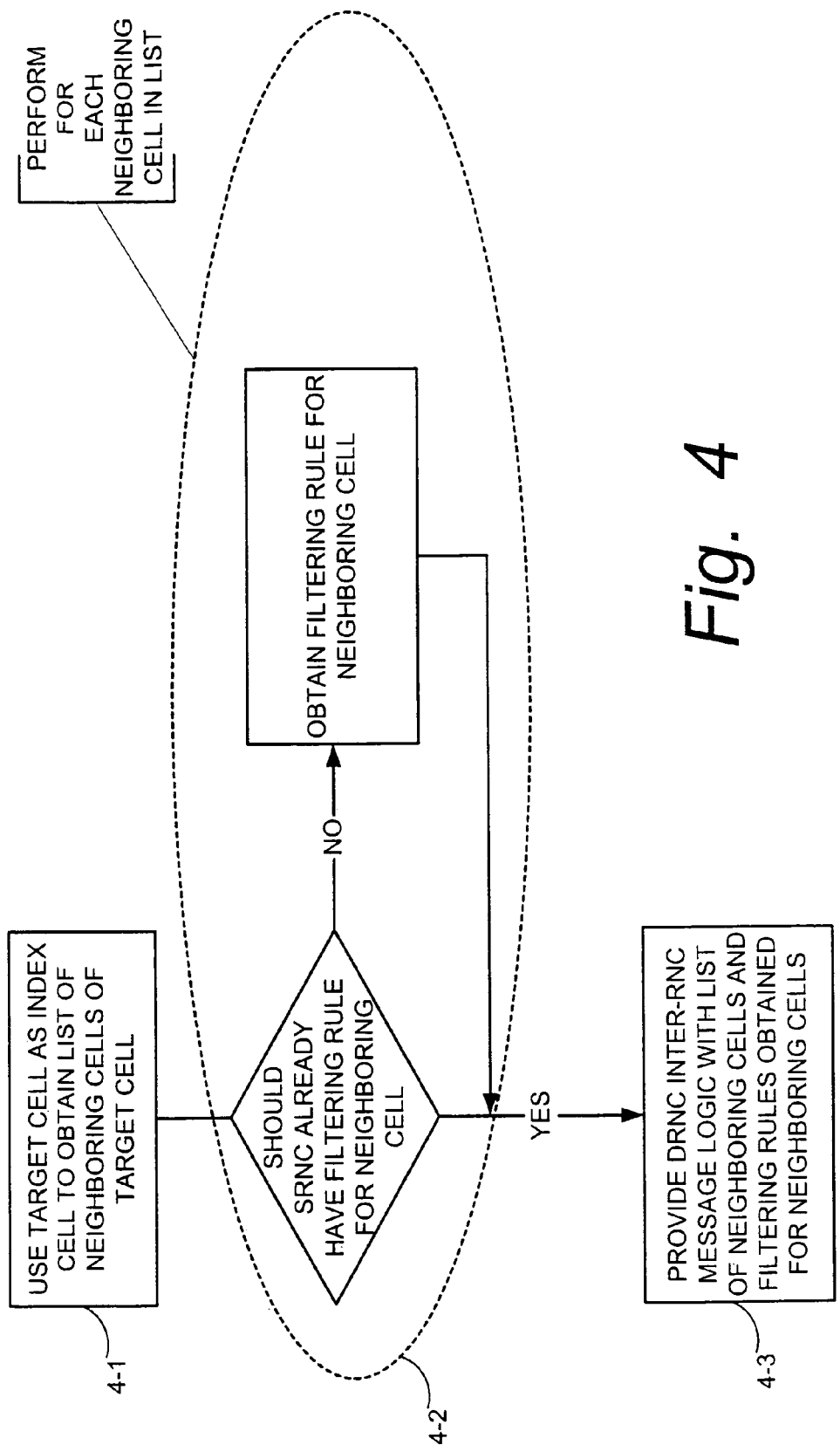
FIG. 4 is a flowchart showing certain basic example steps performed by a table handling logic of the cell filtering function in the FIG. 3 scenario.

Operations of cell filtering function $112_2$ of drift radio network controller (DRNC) $26_2$ are primarily supervised by table handling logic 122. Basic steps or events executed by table handling logic 122 are shown in the flowchart of FIG. 4 in conjunction with FIG. 3. Upon handover to the target cell, the drift radio network controller (DRNC) $26_2$ determines the candidate cell(s) for the user equipment unit by consulting cell topology table 120. In particular, as shown by arrow 3-1 in FIG. 3 and step 4-1 of FIG. 4, the table handling logic 122 utilizes the target cell as the index cell (to obtain from the second field of the row associated with the index/target cell) the list of neighboring cells for the target cell. As seen from the example cell topology table 120 of FIG. 2, the neighboring cells for the target cell $C_{2-1}$ are cell $C_{1-2}$, cell $C_{2-2}$, cell $C_{3-1}$, and cell $C_{3-2}$.

As shown by step 4-2 in FIG. 4, the table handling logic 122 obtains from cell topology table 120 the filtering rule for certain ones of the neighboring cells for the target cell. Specifically, the table handling logic 122 obtains the filtering rule for neighboring cells for which table handling logic 122 surmises that the serving radio network controller (SRNC) $26_1$ does not already have such information. In the illustrated example, therefore, table handling logic 122 obtains the filtering rule for cell $C_{2-2}$, cell $C_{3-1}$, and cell $C_{3-2}$, as shown by events $3\text{-}2_{2-2}$, $3\text{-}2_{3-1}$, and $3\text{-}2_{3-2}$, respectively, in FIG. 3. In the example scenario of FIG. 2, the table handling logic 122 has concluded that the serving radio network controller (SRNC) $26_1$ already has the filtering rule for cell $C_{1-2}$ (since cell $C_{1-2}$ is controlled by serving radio network controller (SRNC) $26_1$). Of course, if the table handling logic 122 did not wish to presume for what cells the serving RNC (SRNC) already has the filtering rule, the table handling logic 122 could also perform event 3-2 for such cells so that such filtering rules would be included in the filtering rule-bearing message.

The filtering rule can be expressed as a subscriber group or list of subscriber groups. The subscriber groups and their compositions can be pre-agreed among operators, so that (for example) each operator knows which subscriber can be included in a particular subscriber group. For example, a first subscriber group (SG) could comprise all subscribers of a first operator, and all subscribers that have roaming agreements with that operator. Operators, and thus a subscriber group can be defined or expressed, for example, as one or more IMSI-PLMNs. As used herein, the term "IMSI-PLMN" means the PLMN which has been extracted from the IMSI of a user equipment unit (it being kept in mind that the IMSI of many user equipment units will have the same IMSI-PLMN). For example, a first subscriber group (subscriber group 1 [SG1] may comprise IMSI-PLMN 1; a second subscriber group (subscriber group 2 [SG2] may comprise IMSI-PLMN 2; and so forth.

In the example scenario of FIG. 2, the filtering rule for each candidate cell comprises a list of subscriber groups allowed for the respective candidate cell. In the particular situation shown in FIG. 3, the serving radio network controller (SRNC) $26_1$ and the drift radio network controller (DRNC) $26_2$, as well as the base stations (and thus the cells) controlled thereby, all comprise resources of a UTRAN which is shared by plural operators (e.g., a first operator OP1 and a second operator OP2), and thus is a shared network. The shared network comprised of the serving radio network controller (SRNC) $26_1$ and the drift radio network controller (DRNC) $26_2$ is available to user equipment units which belong to subscriber group SG1 and SG2. The particular user equipment unit (UE) 30 illustrated herein subscribers to the second operator OP2, and is a member of subscriber group SG2.

Since cell $C_{2-2}$ is a cell of the shared radio access network (RAN) $24_S$, the filter rule for cell $C_{2-2}$ indicates that subscribers of the first operator (OP1) and second operator (OP2) are allowed to utilize cell $C_{2-2}$. The filter rule for cell $C_{3-1}$ and cell $C_{3-2}$, on the other hand, indicates that only user equipment units belonging to the first subscriber group (SG) are allowed to utilize those cells, which can be appropriate if, for example, cell $C_{3-1}$ and cell $C_{3-2}$ are unshared cells.

As step 4-3 of FIG. 4 and event 3-3 of FIG. 3, the table handling logic 122 provides the inter-RNC messaging function $110_2$ of drift radio network controller (DRNC) $26_2$ with the filtering rule(s) obtained at step 4-2. As depicted by event 3-4 of FIG. 3, the inter-RNC messaging function $110_2$ then prepares and transmits to radio resource control (RRC) unit 100 of serving radio network controller (SRNC) $26_1$ a filtering rule-bearing Iur message which includes the filtering rule(s) 300 obtained at step 4-2. Optionally (and preferably), the filtering rule-bearing Iur message can also include the list 302 of neighboring cells (e.g., the neighboring cell list).

Upon receipt of the filtering rule-bearing Iur message, as indicated generally by event 3-5 of FIG. 3 the radio resource control (RRC) unit 100 of serving radio network controller (SRNC) $26_1$ utilizes measurement list generator 102 to prepare the measurement list for user equipment unit (UE) 30. In particular, measurement list generator 102 inputs to cell filter 104 the filtering rule(s) 300 obtained at step 4-2 for the certain cells on the list of neighboring cells, whereupon the cell filter 104 advises the measurement list generator 102 which cells to include in the measurement list for user equipment unit (UE) 30. In the particular scenario and particular time shown in FIG. 3 (as well as other modes herein), since the user equipment unit subscribes to the second operator OP2 and not the first operator OP1, the measurement list for user equipment unit (UE) 30 includes cell $C_{1-1}$, cell $C_{2-1}$, and cell $C_{2-2}$, but not cell $C_{3-1}$ and not cell $C_{3-2}$. Event 3-6 of FIG. 3 shows the radio resource control (RRC) unit 100 transmitting the measurement list prepared by measurement list generator 102 to user equipment unit (UE) 30, the transmission of the measurement list being via, e.g., drift radio network controller (DRNC) $26_2$.

When the filtering rule is expressed in terms of one or more subscriber group(s) [SG], the serving network controller (SRNC) consults a table or other stored memory. The SRNC employs such table/memory to equate the received IMSI to a subscriber group [SG] which can be utilized by the cell filter 104. Such table/memory can be pre-stored at an RNC node and reflect the pre-agreement of operators as above mentioned.

Figure 3A:
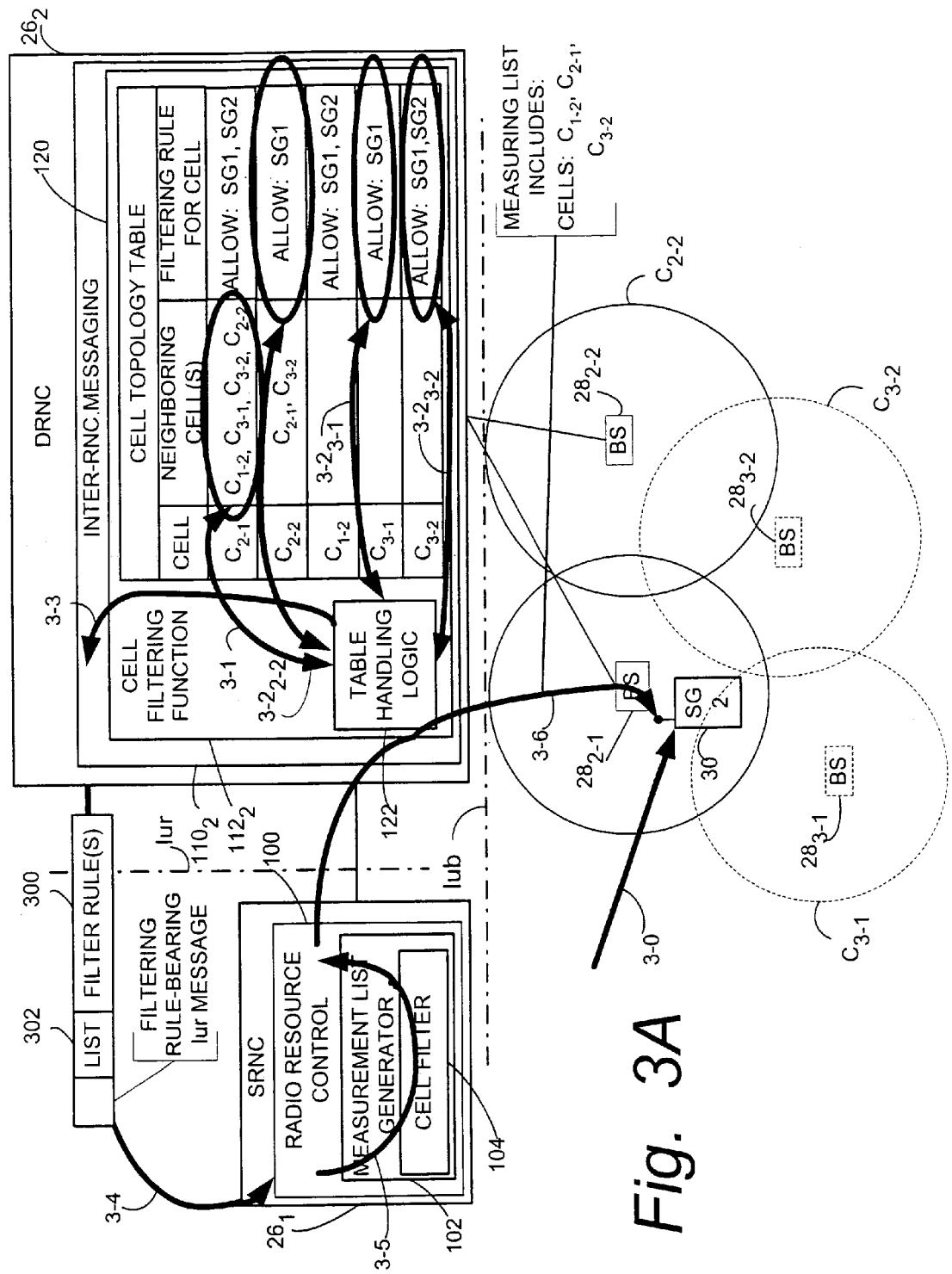

FIG. 3A shows a scenario in which the cell $C_{2-1}$ controlled by radio network controller (RNC) $26_2$ has a filtering rule which allows subscriber groups SG1 and SG2, while cell $C_{2-2}$ controlled by the same radio network controller (RNC) $26_2$ has a filtering rule which allows only subscriber group SG1. Also, cell $C_{3-2}$ controlled by radio network controller (RNC) $26_3$ has a filtering rule which allows subscriber groups SG1 and SG2, while cell $C_{3-1}$ controlled by the same radio network controller (RNC) $26_3$ has a filtering rule which allows only subscriber group SG1. In other respects, the situation of FIG. 3A resembles that of FIG. 3. In the FIG. 3A situation, the measurement list for user equipment unit (UE) 30 includes cell $C_{1-1}$, cell $C_{2-1}$, and cell $C_{3-2}$, but not cell $C_{2-2}$ or cell $C_{3-1}$.

As understood from the foregoing, the drift radio network controller (DRNC) $26_2$ can include, in the filtering rule-bearing Iur message to the serving radio network controller (SRNC), the filtering rules for each neighbor cell which comprises the list of neighboring cells. The list of neighboring cells 302 can also optionally be transmitted in the filtering rule-bearing Iur message to the serving radio network controller (SRNC) over the Iur interface. In a UTRAN implementation, the filtering rules can be included in a RADIO LINK SETUP RESPONSE message over the Iur interface.

The filtering rules can also be included in other Iur messages, e.g. a RADIO LINK ADDITION RESPONSE message, a RADIO LINK SETUP FAILURE message, or a RADIO LINK ADDITION FAILURE message, for example. Thus, the filtering rule-bearing Iur message can be realized as any of these example messages. The filtering rule(s) can be included in these or other messages in an appropriate information element or field, such as the "neighboring UMTS cell information" currently specified for various Iur messages, and which is illustrated in the accompanying tables.

The cell topology table 120 can also be structured or conceptualized in terms of cell relations. In such case, for each cell a group of cell relations is stored. Each cell relation points to a cell (target cell) to which the cell (the source cell) can handover. If a particular RNC node does not control the cell (target cell) to which the relation points (e.g., if that target cell is controlled by another RNC), then the RNC creates an "external cell". The "external cell" is a mirror image of the real cell controlled by the other node, and contains relevant information on that cell that is required to be sent to the user equipment unit in the measurement list (so that the user equipment unit can perform measurements on that cell). The image can be a container which possesses some cell data that mirrors the real cell data stored in the other RNC. An external cell can be implemented as a managed object model, for example.

Therefore, when a serving radio network controller (SRNC) sets up a radio link in a cell controlled by the drift radio network controller (DRNC), it can first set up a radio link in a target cell that it has configured as a neighbor cell (or external cell), and for which it stores information. In the response to that radio link setup, the drift radio network controller (DRNC) will inform the serving radio network controller (SRNC) about neighbors to the target cell. The serving radio network controller (SRNC) may have already configured some of these neighbors as external cells, but other neighbor cells may not yet be so configured. The information returned to the serving radio network controller (SRNC) will include all neighbor cells of the target cell in the drift radio network controller (DRNC), with some of these neighbor cells possibly being in a third RNC. In that case those cells will be configured as external cells in the DRNC.

Once the serving radio network controller (SRNC) has the information on the neighbor cells from the drift radio network controller (DRNC), the serving radio network controller (SRNC) can ask the user equipment unit to measure on those cells by sending the measurement list over the RRC connection to the user equipment unit. The user equipment unit will then inform the serving radio network controller (SRNC) when a measurement criteria is satisfied, e.g., when the signal strength of the user equipment unit for one of the cells in the list is greater than a particular threshold. If, for example, that cell was in the third RNC, and the serving radio network controller (SRNC) decided to setup a radio link in that cell, and include it in it's active set, the serving radio network controller (SRNC) would have to send a new RADIO LINK SETUP REQUEST message to the third RNC.

As shown by in FIG. 5A(1)-FIG. 5D(1) and FIG. 5A(2)-FIG. D(2), the filtering rule itself can take various forms, e.g., be expressed in various ways. For example, the filtering rule can comprise a list of subscriber groups which are allowed access to the neighboring cell (e.g., the candidate cell). FIG. 5A(1) shows a cell topology table 120A(1) in which the filtering rule for each index cell is a list of allowed subscriber groups. Note that only subscriber group SG1 is allowed for cell $C_{3-1}$ and cell $C_{3-2}$. Alternatively, the filtering rule can comprise a list of subscriber groups which are not allowed access to the neighboring cell (e.g., the candidate cell). FIG. 5B(1) shows a cell topology table 120B(1) in which the filtering rule for each index cell is a list of disallowed subscriber groups. Note that subscriber group SG2 is among those disallowed for cell $C_{3-1}$ and cell $C_{3-2}$. As yet a further alternative, the filtering rule can comprise a bitmap with a predetermined position of the bitmap corresponding to a subscriber group. FIG. 5C(1) shows a cell topology table 120C(1) in which the filtering rule for each index cell comprises a bitmap wherein bits for allowed subscriber groups are set. In FIG. 5C(1), each bit is indicated by a box or square of the filtering rule field, and set bits have a dotted fill. The bits for both first subscriber group SG1 and second subscriber group SG2 are set for each of cell $C_{2-1}$, cell $C_{2-2}$, and cell $C_{1-2}$, while only the bits for the first subscriber group SG1 are set for each of cell $C_{3-1}$ and cell $C_{3-2}$. As another variation, FIG. 5D(1) shows a cell topology table 120D(1) in which the filtering rule for each index cell comprises a bitmap wherein bits for disallowed subscriber groups are set (e.g., have a dotted fill). In FIG. 5D(1), neither the bits for first subscriber group SG1 nor second subscriber group SG2 are set for each of cell $C_{2-1}$, cell $C_{2-2}$, and cell $C_{1-2}$, while only the bits for the second subscriber group are set for each of cell $C_{3-1}$ and cell $C_{3-2}$.

As yet further examples, instead of being formatted in terms of subscriber group(s), the filtering rule can comprise a list of PLMN identifiers (or IMSI ranges) which are allowed (or not allowed) access to the neighboring cell (e.g., the candidate cell). FIG. 5A(2) through FIG. 5D(2) correspond to FIG. 5A(1) through FIG. 5D(1), but are formatted in terms of lists of PLMN identifiers or IMSI ranges instead of subscriber groups.

The filtering rules can either be stored per cell or per cell relation. A filtering rule being stored "per cell" means that the rule is a type which must be followed in order to handover into the candidate or neighboring cell. A filtering rule being stored per cell relation means that the filtering rule must be followed in order to handover between two cells to which the cell relation applies.

The lists mentioned above as expressing the filtering rule(s) can also include the PLMNid or IMSI series of an operator's subscribers with whom the one or more sharing operators have a roaming agreement. This is necessary because third party roaming subscribers, who have an agreement with one of the sharing operators but not the other sharing operator, can roam into the shared network, or to one of the operator's home networks.

The person skilled in the art will understand that typically the drift radio network controller (DRNC) transmits, in the filtering rule-bearing Iur message to the serving radio network controller (SRNC), filtering rules for plural candidate cells (since generally plural candidate cells surround or are adjacent to the target or selected cell for the user equipment unit). In other words, the DRNC can send over the Iur interface a group of candidate cells together with the filtering rule for each candidate cell sent (and, optionally, the neighboring cell list for each candidate cell). In the example filtering rule-bearing Iur message of FIG. 6A, for example, the filtering rules for each of neighboring cell 1 through and including neighboring cell J are included. In the FIG. 6A filtering rule-bearing Iur message, the filtering rule(s) 300 comprise fields 300-6A$_1$ through 300-6A$_J$ for cells 1 through J, respectively. In the example format for the filtering rule-bearing Iur message of FIG. 6, each filtering rule field 300-6A$_X$ preferably follows a cell identifier field 302-6A$_X$.

Various transmission economizing features of the invention may be employed for reducing the size of the Iur messages which include the filtering rules, such as the filtering rule-bearing Iur message. As a first such transmission economizing feature, the drift radio network controller (DRNC) can associate a group of plural candidate cells having a common filtering rule, and transmit the common filtering rule to the serving radio network controller (SRNC) only once rather than for each candidate cell in the group. One example format for this first economizing feature is illustrated in FIG. 6B. In the filtering rule-bearing Iur message of FIG. 6B, a header or other comparable field of the filtering rule-bearing Iur message includes a parameter indicating the number of groups of cells (the cells of a group all having a same filtering rule). In the example of FIG. 6B, N number of groups are illustrated. For each group there is a list of cells comprising the group, e.g., a field $302\text{-}6B_1$ lists the cells for a first group up and to (and including) a field $302\text{-}6B_N$ which lists the cells for a $N^{th}$ group. For each group a filtering rule field is provided which carries the filtering rule utilized by all cells belonging to the group. For example, a filtering rule field $300\text{-}6B_1$ is included for the cells of the first group; a filtering rule field $300\text{-}6B_2$ is included for the cells of a second group; and so forth up and to a filtering rule field $300\text{-}6B_N$ for the cells of the $N^{th}$ group.

Figure 7:
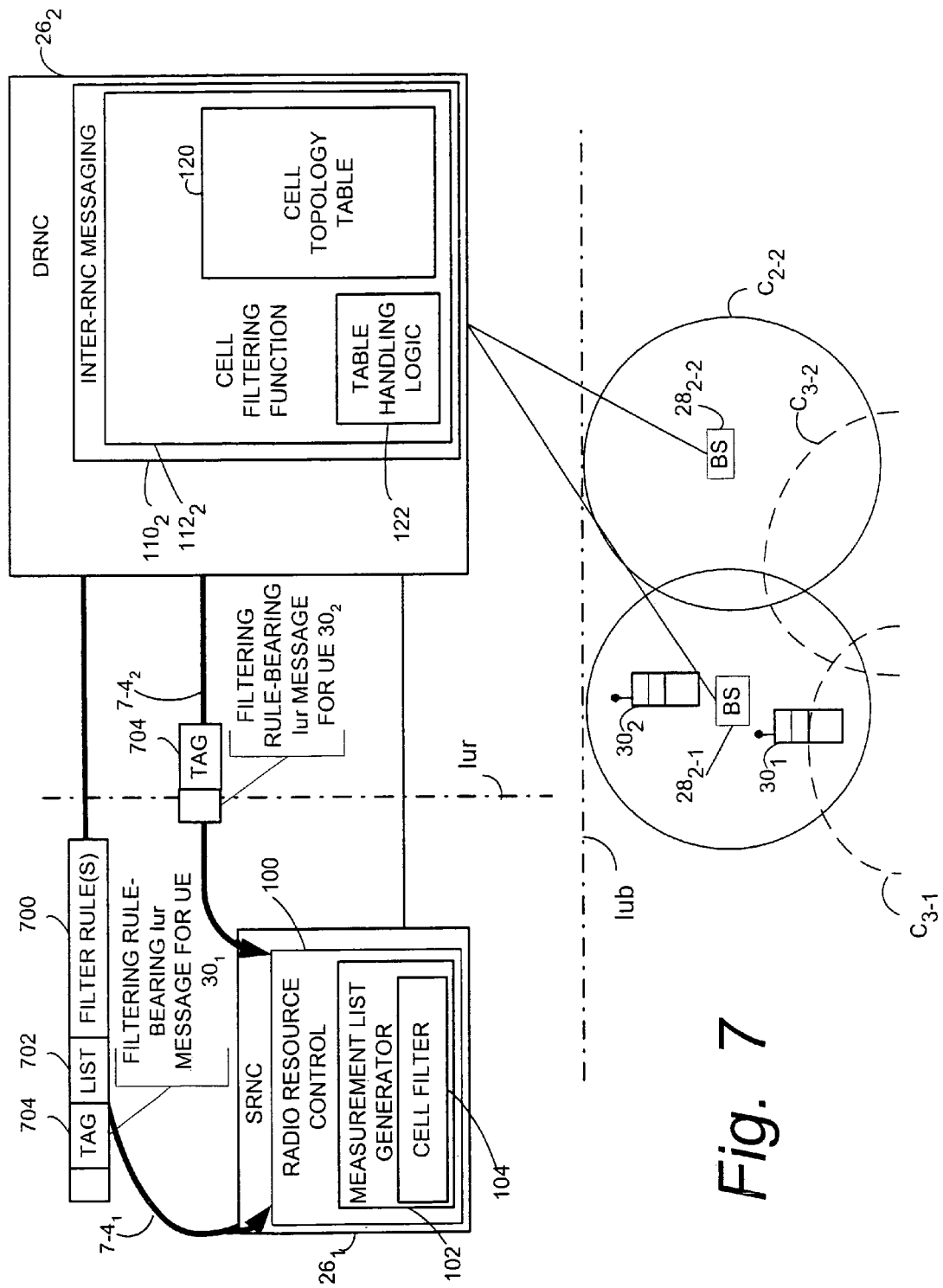
FIG. 7 is a diagrammatic view showing another filtering rule-bearing Iur message transmission economizing feature.

A second transmission economizing feature is advantageous in view of the fact that plural user equipment units with connections controlled by the serving radio network controller (SRNC) are likely operating in cells controlled by drift radio network controller (DRNC). As shown in FIG. 7, for a first such user equipment unit (UE) $30_1$ the drift radio network controller (DRNC) transmits the filtering rule(s) for the candidate cell(s) to the serving radio network controller (SRNC) in a first filtering rule-bearing Iur message as event $7\text{-}4_1$. The event $7\text{-}4_1$ of FIG. 7 is similar to event $3\text{-}4$ of FIG. 3, with the first filtering rule-bearing Iur message of event $7\text{-}4_1$ including the filtering rules [field(s) 700] and (optionally) the list of neighboring cells [field 702]. In addition, the first filtering rule-bearing Iur message of event $7\text{-}4_1$ includes a filtering rule identification tag in field 704 which is associated with the filtering rule(s) of field 700. Subsequently, for a second user equipment unit (UE) $30_2$ similarly situated, as event $7\text{-}4_2$ the drift radio network controller (DRNC) transmits an abbreviated filtering rule-bearing Iur message. The abbreviated filtering rule-bearing Iur message of event $7\text{-}4_2$ for user equipment unit (UE) $30_2$ includes the filtering rule identification tag 704, and by virtue of inclusion of filtering rule identification tag 704 does not require inclusion of the more lengthy filtering rules (e.g., does not require inclusion of a field such as field 700). Nor is the list of neighboring cells (such as carried in field 702) included in the filtering rule-bearing Iur message of event $7\text{-}4_2$ for user equipment unit (UE) $30_2$, which was optional anyway.

Thus, using a basic version of this second transmission economizing feature, the filtering rule for the candidate cell(s) for the second user equipment unit (UE) $30_2$ are not transmitted so long as the candidate cell(s) for the second user equipment unit (UE) $30_2$ are the same as the candidate cell(s) for the first user equipment unit (UE) $30_1$.

A third example transmission economizing feature also uses the concept of a filtering rule identification tag, but in a different sense. As shown in FIG. 6C, the format of a filtering rule-bearing Iur message can be such that a filtering rule identification tag can be employed to refer to the filtering rule for a specific candidate cell, rather than for the collective filtering rule field associated with an earlier user equipment unit (UE). For each neighboring cell, the filtering rule-bearing Iur message of FIG. 6C includes a filtering rule field and a tag associated with that filtering rule field. For example, for user equipment unit (UE) $30_1$ the filtering rule-bearing Iur message of FIG. 6C includes for neighboring cell 1 (identified in field $702\text{-}6C_1$) a filtering rule field $700\text{-}6C_1$ and a filtering rule identification tag $704\text{-}6C_1$. Similarly, the filtering rule-bearing Iur message of FIG. 6C includes for neighboring cell J (identified in field $702\text{-}6C_J$) a filtering rule field $700\text{-}6C_J$ and a filtering rule identification tag $704\text{-}6C_J$. With the advantages of this third example transmission economizing feature, a subsequent filtering rule-bearing Iur message (for the same or a different user equipment unit) can employ the filtering rule identification tag of a candidate cell which was the subject of a prior filtering rule-bearing Iur message, so long as the filtering rule for candidate cell has not been changed. For example, the filtering rule-bearing Iur message of FIG. 6D concerns candidate cells 1 through K. For candidate cell 1 (identified in field $702\text{-}6D_1$) the filtering rule identification tag $704\text{-}6D_1$ is included in the filtering rule-bearing Iur message of FIG. 6D, obviating the need of a filtering rule field in the filtering rule-bearing Iur message of FIG. 6D for cell 1. The filtering rule identification tag $704\text{-}6D_1$ of the filtering rule-bearing Iur message of FIG. 6D advises the cell filter 104 of the serving radio network controller (SRNC) that the filtering rule for cell 1 (with respect to the user equipment unit covered by the filtering rule-bearing Iur message of FIG. 6D) is the same as it was previously for cell 1 (e.g., the same filtering rule for cell 1 as earlier provided in the filtering rule-bearing Iur message of FIG. 6C).

Figure 6E:
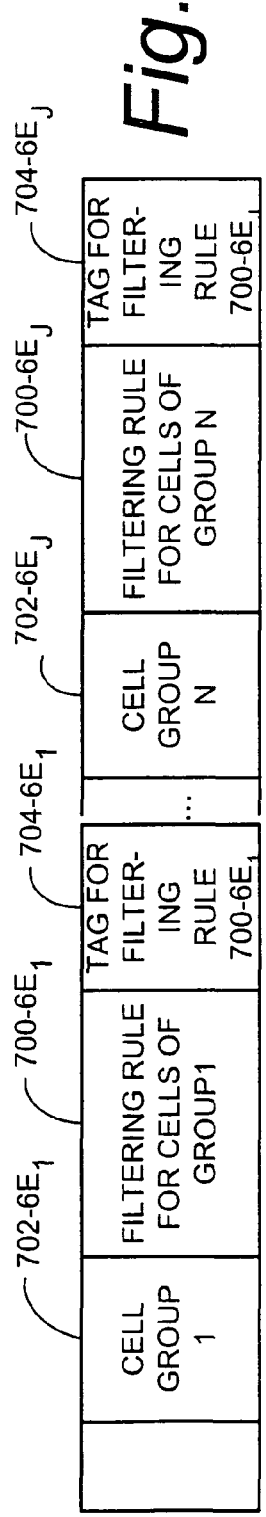
Figure 6F:
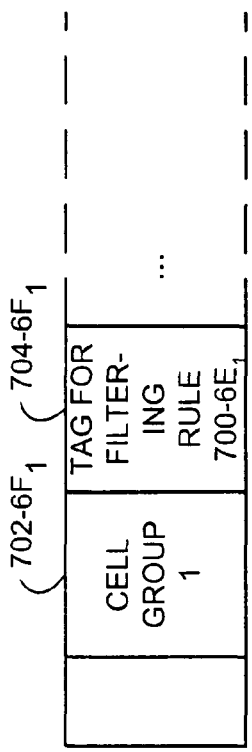

A fourth example transmission economizing feature combines the concept of FIG. 6B and the concept of FIG. 6C/FIG. 6D. In this fourth example transmission economizing feature, illustrated in FIG. 6E and FIG. 6F, the filtering rule identification tag is employed to refer to a list of neighboring cells, rather than to an entire message per se (as was the case in FIG. 7) or to a specific single neighboring field (as was the case in FIG. 6C/FIG. 6E).

Figure 8:
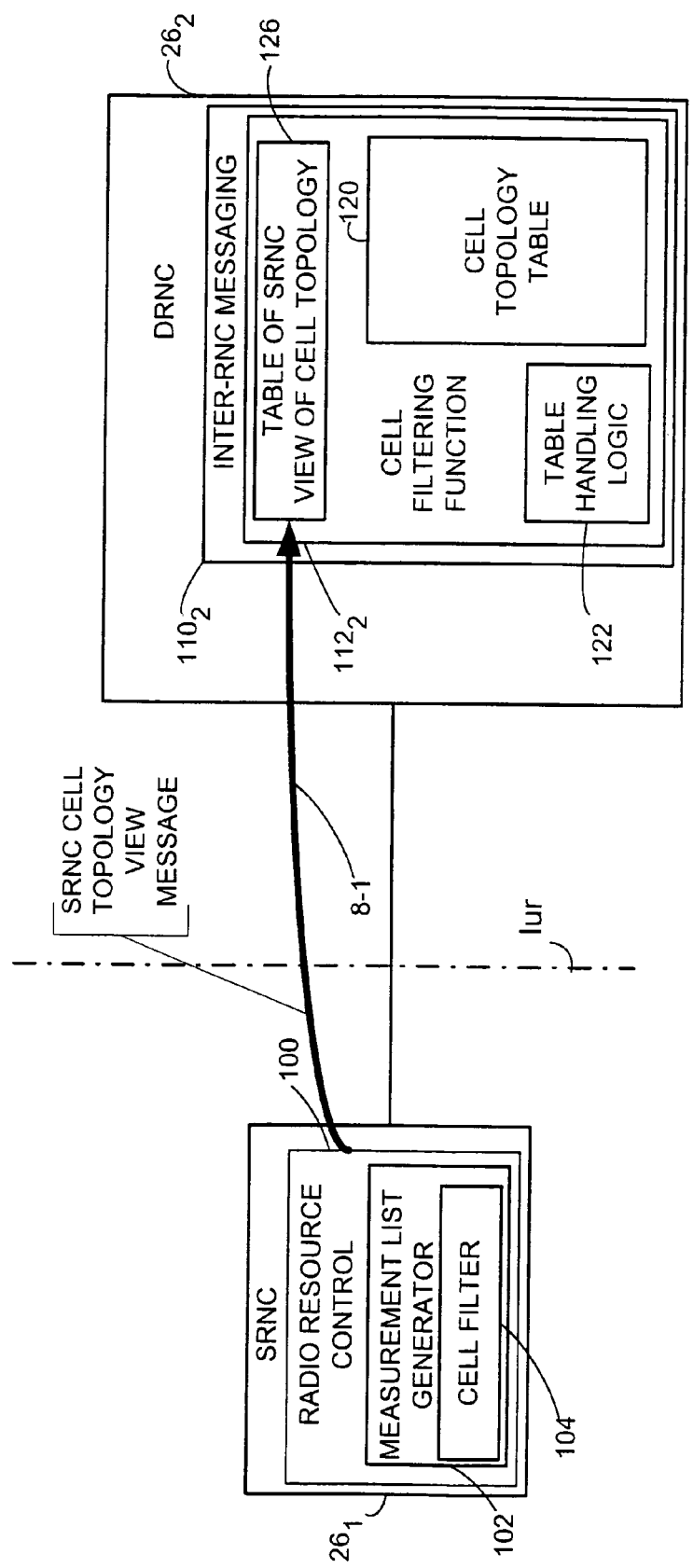
FIG. 8 is a diagrammatic view showing an serving radio network controller (SRNC) optionally providing its view of cell topology to a drift radio network controller (DRNC) in connection with certain filtering rule-bearing Iur message transmission economizing features.

Using the second, third, and fourth transmission economizing features, the filtering rule for the candidate cell(s) (or groups of candidate cells) are not transmitted so long as the respective filtering rule(s) remains unchanged. As an adjunct to the second, third, and fourth transmission economizing features, the serving radio network controller (SRNC) can apprise the drift radio network controller (DRNC) of the serving radio network controller's (SRNC) current version of the filtering rule for the candidate cell. Such is illustrated in FIG. 8 wherein, as indicated by event 8-1, the controller (SRNC) sends a SRNC cell topology view message to the drift radio network controller (DRNC). The SRNC cell topology view message provides the drift radio network controller (DRNC) with the serving radio network controller's (SRNC) current version of the filtering rule for a candidate cell. Such SRNC cell topology view messages for plural candidate cells are utilized by the cell filtering function $112_2$ of drift radio network controller (DRNC) to build a table 126 of the SRNC's view of the cell topology. The drift radio network controller (DRNC) periodically determines whether the filtering rule for A candidate cell is unchanged relative to the serving radio network controller's (SRNC) current version of the filtering rule.

In conjunction with certain ones of the transmission economizing features described above, it should be understood that a filtering rule-bearing Iur message can refer both to groups of neighboring cells and to individual cells, and combinations thereof. For example, a group of neighbor cells could be sent, followed by the filtering rules for those cells, followed by another (single) neighbor cell or group of neighbor cells, followed by the filtering rules for the second cell/group of cells, etc.

Figure 9:
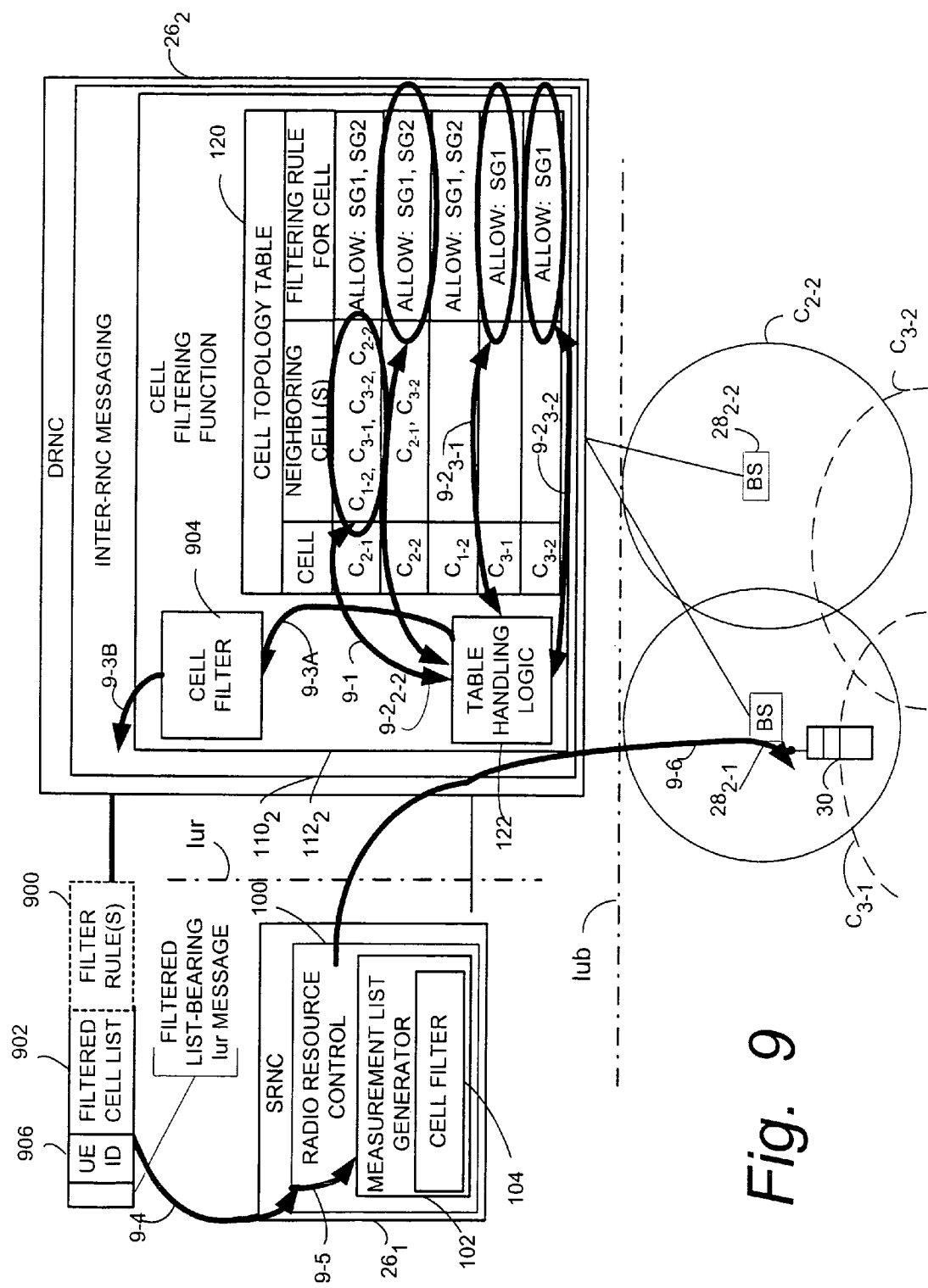
FIG. 9 is a diagrammatic view illustrating a scenario of a drift radio network controller (DRNC)-self filtering mode of operation of the cell filtering function of the present invention.

FIG. 9 illustrates another mode of the invention in which the drift radio network controller (DRNC) itself applies the filtering rule to determine whether the candidate cell qualifies for the measurement list. As in other modes, in this drift radio network controller (DRNC)-self filtering mode the filtering rule provides criteria for determining whether the candidate cell qualifies for inclusion in a measurement list of cells for the user equipment unit. In this drift radio network controller-filtering rule applying mode, the drift radio network controller (DRNC) transmits to the serving radio network controller (SRNC) a list of cells suitable for inclusion in the measurement list as determined by the drift radio network controller's application of the filtering rule. To facilitate application of the filtering rule, the table handling logic 122 of the drift radio network controller (DRNC) includes a cell filter 904. The cell filter 904 serves to apply the filtering rule for each neighboring cell included in the neighboring cell list for a target cell.

Figure 10:
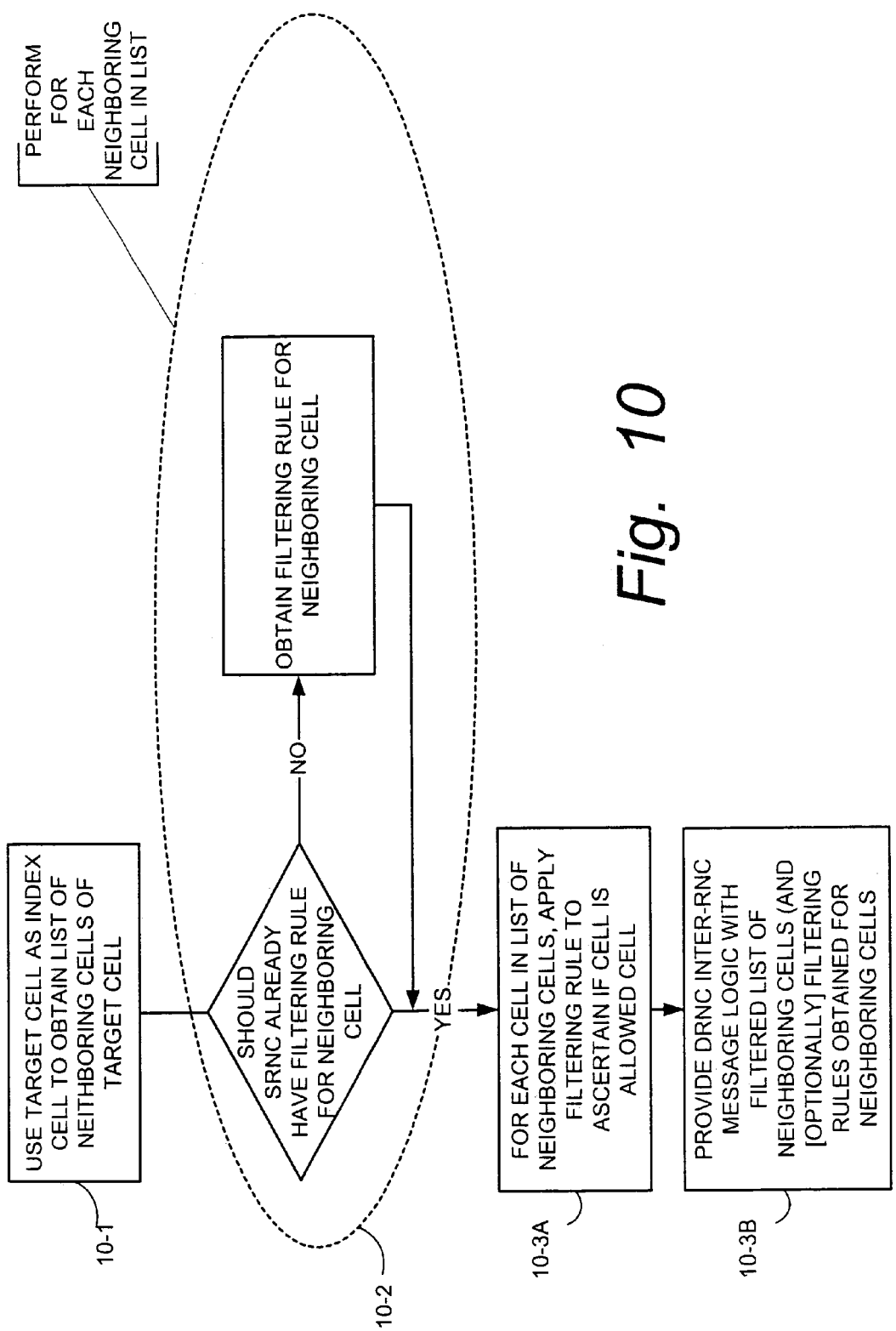
FIG. 10 is a flowchart showing certain basic example steps performed by a table handling logic of the cell filtering function in the FIG. 9 scenario.

Basic steps or events executed by table handling logic 122 for the drift radio network controller (DRNC)-self filtering mode are illustrated in the flowchart of FIG. 10 in conjunction with FIG. 9. After a triggering event such as handover to the target cell, the drift radio network controller (DRNC) 26₂ determines the candidate cell(s) for the user equipment unit by consulting cell topology table 120. In particular, as shown by arrow 9-1 in FIG. 9 and step 10-1 of FIG. 10, the table handling logic 122 utilizes the target cell as the index cell to obtain from the second field of the row associated with the index/target cell the list of neighboring cells for the target cell. As seen from the example cell topology table 120 of FIG. 9, the neighboring cells for the target cell $C_{2-1}$ are cell $C_{1-2}$, cell $C_{2-2}$, cell $C_{3-1}$, and cell $C_{3-2}$.

As shown by step 10-2 in FIG. 10, the table handling logic 122 obtains from cell topology table 120 the filtering rule for certain ones of the neighboring cells for the target cell. As in the previously illustrated example of FIG. 2 and FIG. 3, the table handling logic 122 obtains the filtering rule for cell $C_{2-2}$, cell $C_{3-1}$, and cell $C_{3-2}$, as shown by events 9-2₂₋₂, 9-2₃₋₁, and 9-2₃₋₂, respectively, in FIG. 9.

As step 9-3A of FIG. 9 and event 10-3 of FIG. 10, the table handling logic 122 provides the cell filter 904 with both the list of neighboring cells for the target cell (obtained at event 9-1), as well as the filtering rule for each cell in the list of neighboring cells. The filtering rules were obtained, e.g., at events 9-2₂₋₂, 9-2₃₋₁, and 9-2₃₋₂. The cell filter 904 produces a filtered list of neighboring cells, and as event 9-3B applies the filtered list of neighboring cells to the inter-RNC messaging function 110₂ of drift radio network controller (DRNC) 26₂. As depicted by event 9-4 of FIG. 9, the inter-RNC messaging function 110₂ then prepares and transmits to radio resource control (RRC) unit 100 of serving radio network controller (SRNC) 26₁ a filtered list-bearing Iur message which includes the filtered list produced by cell filter 904. The filtered list-bearing Iur message carries a field 906 having an identification of the particular user equipment unit for which the filtered list field 902 pertains. Optionally (and preferably), the filtered list-bearing Iur message can also include the list of neighboring cells (e.g., the neighboring cell list).

Upon receipt of the filtered list-bearing Iur message, as indicated generally by event 9-5 of FIG. 3 the radio resource control (RRC) unit 100 of serving radio network controller (SRNC) 26₁ utilizes measurement list generator 102 to prepare the measurement list for user equipment unit (UE) 30. The measurement list generator 102 primarily utilizes the filtered list obtained from field 902 of the filtered list-bearing Iur message of event 9-4. Event 9-7 of FIG. 9 shows the radio resource control (RRC) unit 100 transmitting the measurement list prepared by measurement list generator 102 to user equipment unit (UE) 30, the transmission of the measurement list being via, e.g., drift radio network controller (DRNC) 26₂.

As shown by the broken line field 900 in FIG. 9, in the filtered list-bearing Iur message of event 9-4 the drift radio network controller (DRNC) may optionally also transfer to the serving radio network controller (SRNC) the filtering rule for the cells included in the filtered list of field 902.

Implementation of the drift radio network controller (DRNC)-filtering rule applying mode as exemplary illustrated in FIG. 9 and FIG. 10 requires that the drift radio network controller (DRNC) know the international mobile subscriber identity (IMSI) for the user equipment unit. In this mode, the drift radio network controller (DRNC) essentially filters the neighbor cell list before sending the list back to the serving radio network controller (SRNC) over the Iur interface. The filtered list-bearing Iur message of event 9-4 can take the form of the Iur messages already mentioned including the RADIO LINK SETUP RESPONSE MESSAGE (and other Iur messages including neighbor cells and filtering rules).

One advantage of the drift radio network controller (DRNC)-filtering rule applying mode is that less neighboring cell information is sent over the Iur interface to the serving radio network controller (SRNC). Unless specifically desired, no filtering rules per se have to be sent over the Iur interface.

The drift radio network controller (DRNC)-filtering rule applying mode does require that the IMSI be known by the drift radio network controller (DRNC) in order to perform the filtering. The drift radio network controller (DRNC) could receive the IMSI in the RADIO LINK SETUP REQUEST from the serving radio network controller (SRNC). However, the IMSI is not always available when the radio link is setup and sometimes may need to be sent later (e.g., when the serving radio network controller (SRNC) receives the IMSI from the core network). This situation is discussed in the subsequently described modes of the invention. In any event, if the drift radio network controller (DRNC) does not have the IMSI, the drift radio network controller (DRNC) should send all neighbor cells back to the serving radio network controller (SRNC).

Figure 11:
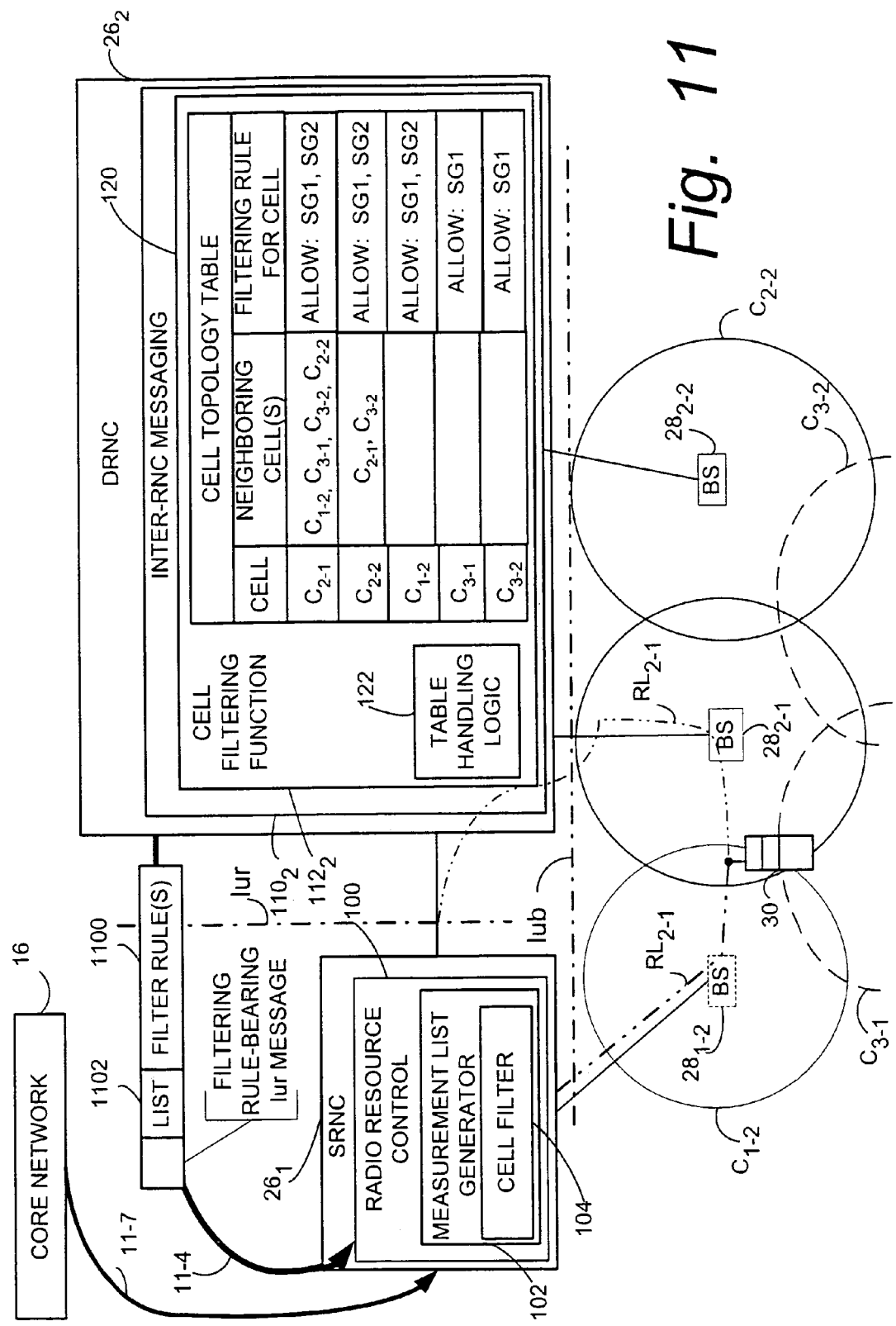
FIG. 11 is a diagrammatic view illustrating a mode of the invention in which an IMSI of a user equipment unit is unknown upon connection setup.

In another mode of the invention illustrated in FIG. 11, the serving radio network controller (SRNC) has set up one or more radio links for the connection with the user equipment unit in a corresponding one or more cells. At least one of the cells having a radio link is controlled by the drift radio network controller (DRNC). For example, FIG. 11 shows the connection being set up with radio link $RL_{1-2}$ in cell $C_{1-2}$ and radio link $RL_{2-1}$ in cell $C_{2-1}$. Radio links are shown herein by dashed/double-dotted lines. At the time of connection setup, the international mobile subscriber identity (IMSI) of the user equipment unit is not yet known by the serving radio network controller (RNC) 26₁.

Figure 12:
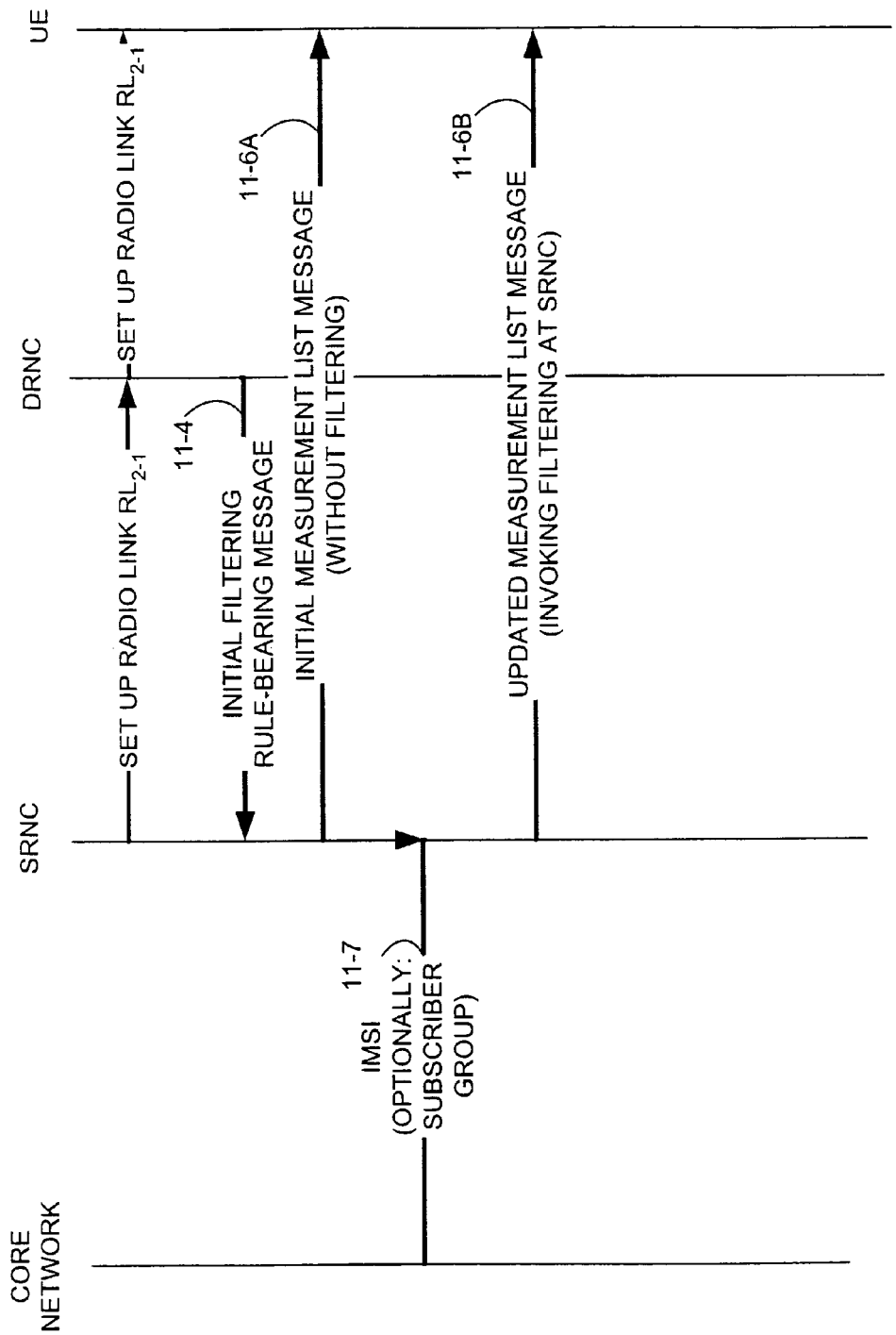
FIG. 12 is a diagrammatic view depicting various messages transmitted in conjunction with the mode of FIG. 11.

A sequence of pertinent messages also involved with the mode of FIG. 11 is illustrated in FIG. 12. As in the first mode, the drift radio network controller (DRNC) transmits to the serving radio network controller (SRNC) a filtering rule for one or more candidate cells using a filtering rule-bearing Iur message such as that indicated by event 11-4. Although not illustrated as such in FIG. 1, it should be understood that the filtering rule message of event 11-4 is preceded by various events which utilize cell topology table 120 and which are comparable to events 3-1, 3-2$_{i,j}$, and 3-3 of the FIG. 3 scenario. The filtering rule-bearing Iur message of event 11-4 can include a neighboring list field 1102 and a filtering rule field 1100.

Since, upon receipt of the filtering rule-bearing Iur message of event 11-4, the serving radio network controller (SRNC) 26₁ does not yet know the IMSI of the user equipment unit involved in the connection, the measurement list generator 102 of the serving radio network controller (SRNC) 26₁ cannot yet invoke its cell filter 104. Rather, the measurement list generator 102 instead generates a measurement list which includes all neighboring cells included in the neighboring cell list field 1102 of the filtering rule-bearing Iur message of event 11-4. The serving radio network controller (SRNC) 26$_1$ transmits the all-inclusive measurement list to user equipment unit in a measurement list message such as that depicted as event 11-6A in FIG. 12. The measurement list message of event 11-6A is sent to user equipment unit preferably over the established radio links, e.g., radio link RL$_{1-2}$ in cell C$_{1-2}$ and radio link RL$_{2-1}$ in cell C$_{2-1}$. Being all-inclusive, the measurement list message of event 11-6A includes cell C$_{3-1}$ and cell C$_{3-2}$, even though cell C$_{3-1}$ and cell C$_{3-2}$ are allowed only for the first subscriber group SG1 and the user equipment unit 30 is instead a subscriber of the second subscriber group SG2. But at this stage the measurement list generator 102 does not know the IMSI of the user equipment unit, and therefore cannot filter out the inappropriate cells for user equipment unit (UE) 30.

Subsequently, as indicated by event 11-7 in FIG. 11 and FIG. 12, the serving radio network controller (SRNC) 26$_1$ learns, e.g., from core network 16, the international mobile subscriber identity (IMSI) for the user equipment unit 30. Knowing the IMSI of the user equipment unit, the serving radio network controller (SRNC) 26$_1$ can use the international mobile subscriber identity (IMSI) to check at least one of the following: (1) whether the initial measurement list for the user equipment unit should be updated to delete any candidate cell; and (2) whether the radio link for the selected cell (e.g., cell C$_{2-1}$) should be removed. In the situation shown in FIG. 11, the filtering rule for the selected cell (e.g., cell C$_{2-1}$) was already known by the serving RNC (SRNC) since selected cell C$_{2-1}$ was an exterior cell for the serving RNC (SRNC), so that there is no need to remove the radio link RL$_{2-1}$. But concerning the measurement list, by invoking the cell filter 104 the measurement list generator 102 ascertains that cell C$_{3-1}$ and cell C$_{3-2}$ should not be included in the measurement list for user equipment unit (since cell C$_{3-1}$ and cell C$_{3-2}$ are limited to allow only to the first subscriber group SG1 and the user equipment unit instead belongs to the second subscriber group SG2). Accordingly, the measurement list generator 102 generates an updated measurement list which omits cell C$_{3-1}$ and cell C$_{3-2}$ and which is transmitted to the user equipment unit as event 11-6B (see FIG. 12).

In a case in which plural radio links are initially established by the serving radio network controller (SRNC) with the user equipment unit, and in which upon subsequent receipt of the international mobile subscriber identity (IMSI) the serving radio network controller (SRNC) determines that all of the radio links are not permitted, the serving radio network controller (SRNC) can prudently move the user equipment unit to a permitted cell before tearing down the non-permitted radio links. This sequence of events is preferable to just dropping the call if the serving radio network controller (SRNC) were to notice that the user equipment unit only has radio links in unallowed cells. For example, in the scenario shown in FIG. 11, if the radio links with user equipment unit (UE) 30 had initially been set up in non-allowed cell C$_{3-1}$ and/or non-allowed cell C$_{3-2}$ in view of lack of knowledge of the IMSI of user equipment unit (UE) 30, but learning of the IMSI of user equipment unit (UE) 30 the serving RNC (SRNC) could move the user equipment unit (UE) to an allowed cell such as cell C$_{2-1}$ [e.g., establish a radio link in cell C$_{2-1}$] before tearing down the radio links in non-allowed cell C$_{3-1}$ and/or non-allowed cell C$_{3-2}$.

Yet another mode of the invention is known as the hybrid mode. In the hybrid mode of operation, during at least a portion of the life of a connection with the user equipment unit the serving radio network controller (SRNC) is capable of applying the filtering rule (e.g., for the candidate cell), and during at least a portion (preferably another portion) the drift RNC (DRNC) is capable of applying the filtering rule (e.g., for the candidate cell). In the hybrid mode, the cell filtering function 112$_2$ of the drift radio network controller (DRNC) 26$_2$ has a cell filter similar to cell filter 904 of the DRNC-filtering rule applying mode.

Figure 11A:
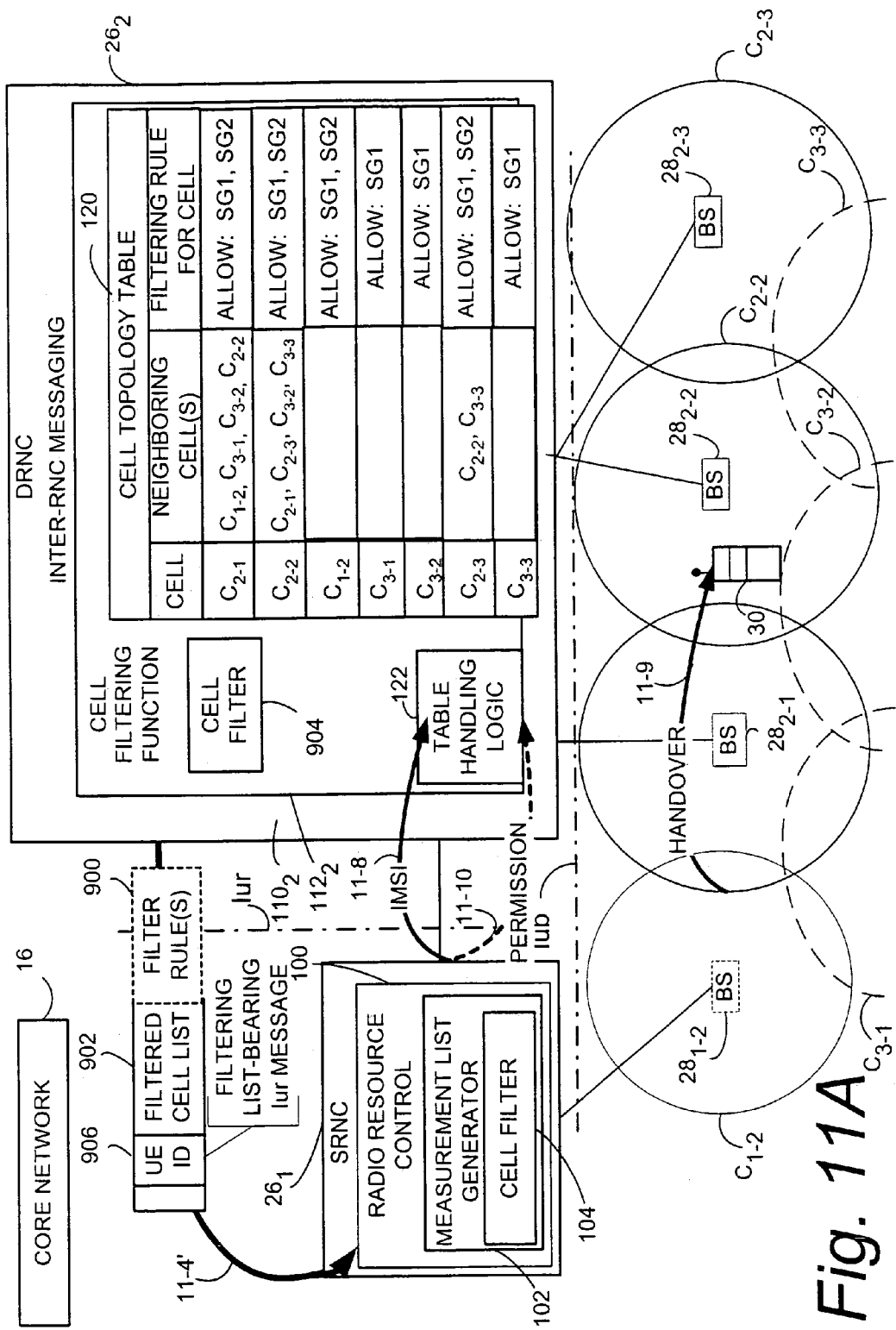
FIG. 11A is a diagrammatic view illustrating a first example scenario of a hybrid mode of the invention.
Figure 12A:
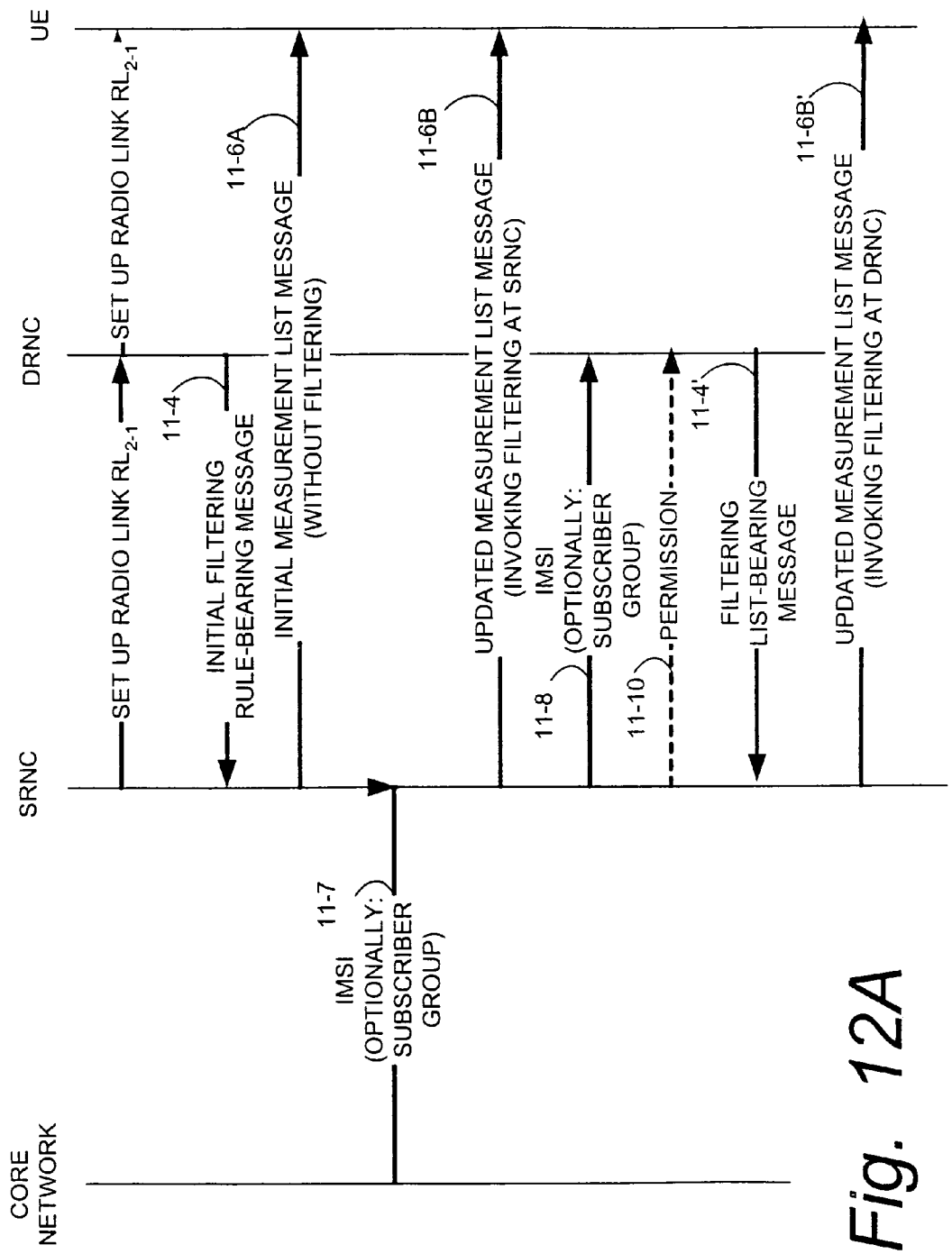
FIG. 12A is a diagrammatic view depicting various messages transmitted in conjunction with the first scenario of the hybrid mode of FIG. 11A.

A first example scenario of the hybrid mode illustrated in FIG. 11A and FIG. 12A essentially builds on the previously-described scenario of FIG. 11 and FIG. 12. It will be recalled that, in the scenario of FIG. 11 and FIG. 12, the serving radio network controller (SRNC) had set up one or more radio links for the connection with the user equipment unit in a corresponding one or more cells, but at the time of connection setup the international mobile subscriber identity (IMSI) of the user equipment unit was not yet known by the serving radio network controller (RNC). The drift radio network controller (DRNC) had transmitted to the serving radio network controller (SRNC) a filtering rule-bearing Iur message (indicated by event 11-4) which included a neighboring list field 1102 and a filtering rule field 1100. Since the measurement list generator 102 initially did not know the IMSI of the user equipment unit, the measurement list generator 102 was unable to utilize the filtering rules transmitted in the filtering rule-bearing Iur message, so instead the measurement list generator 102 included all the cells in the neighboring cell list in an initial measurement list message (event 11-6A) transmitted to the user equipment unit. Thereafter, upon learning the IMSI of the user equipment unit, the measurement list generator 102 applied the filtering rules already obtained in the filtering rule-bearing Iur message, so that the radio resource control (RRC) unit 100 sent as event 11-6B an updated measurement list message to the user equipment unit.

For describing the first example scenario of the hybrid mode, FIG. 11A and FIG. 12A continue the scenario of FIG. 11 and FIG. 12 with the serving radio network controller (SRNC) 25, sending the IMSI of the user equipment unit to the drift radio network controller (DRNC) 26$_2$, as reflected by event 11-8. Since it now knows the IMSI of the user equipment unit and has its own cell filter 904, the cell filtering function 112$_2$ can henceforth perform at least some cell filtering for the user equipment unit in the manner of the DRNC-self filtering mode of FIG. 9.

Figure 11B:
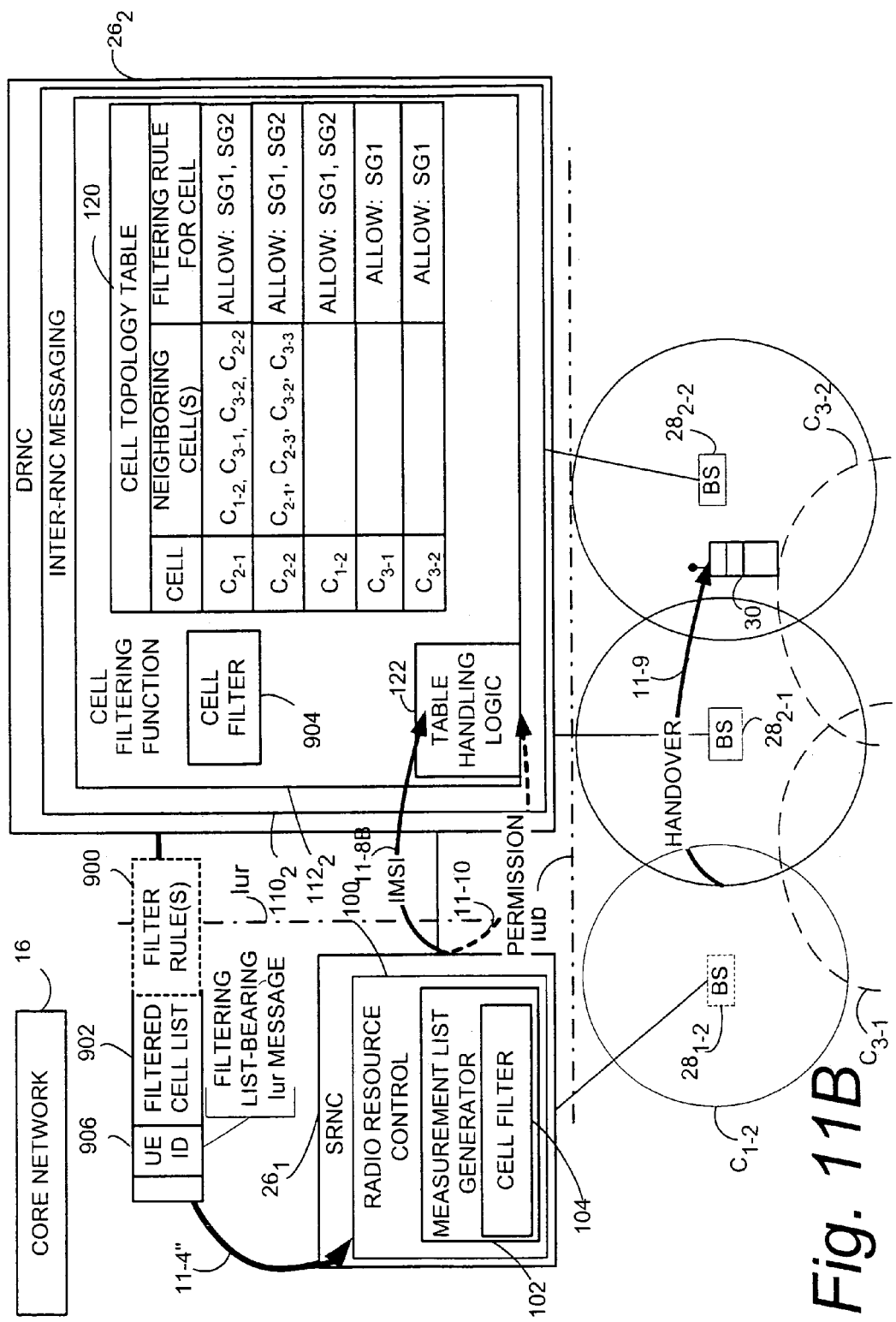
FIG. 11B is a diagrammatic view illustrating a second example scenario of a hybrid mode of the invention.

The hybrid mode of FIG. 11A and FIG. 12 is beneficial (for example) in a situation in which, after the drift radio network controller (DRNC) learns the IMSI of the user equipment unit, the user equipment unit is involved in a handover to another cell (e.g., handover to one of the candidate cells that was included in the earlier filtering rule-bearing Iur message [e.g., event 11-4A] from drift radio network controller (DRNC) 26$_2$ to serving radio network controller (SRNC) 26$_1$). In this regard, FIG. 11B shows by arrow 11-9 an example handover of user equipment unit (UE) 30 to cell C$_{2-2}$.

FIG. 11A shows some additional cells beyond those previously illustrated, e.g., by FIG. 3. As seen in FIG. 11A, cell C$_{2-2}$ to which the user equipment unit (UE) 30 has been handed over has the following cells as neighbors: cell C$_{2-1}$, cell C$_{2-3}$, cell C$_{3-2}$, and cell C$_{3-3}$. These neighboring cells are thus now considered as "further" or "another" candidate cells for possible inclusion in the measurement list for user equipment unit. Of these cells, cell C$_{2-1}$ and cell C$_{2-3}$ are available both to subscriber group SG1 and subscriber group SG2, while cell C$_{3-2}$ and cell C$_{3-3}$ are available only to subscriber group SG1. It will be recalled that user equipment unit (UE) 30 is a member of the second subscriber group SG2, and thus ineligible for utilization of cell C$_{3-2}$ and cell C$_{3-3}$. In FIG.

11A, cell topology table 120 has been augmented to reflect existence of new cell $C_{2-3}$ and new cell $C_{3-3}$.

In the scenario of FIG. 11A and FIG. 12A, the drift radio network controller (DRNC) 26₂ now becomes involved in the filtering since it knows the IMSI of user equipment unit (UE) 30 and since a new measurement list should be generated (e.g., since there is a further or another candidate cell to be considered for inclusion in the measurement list). In essence, in view of its capability of performing the cell filtering, the cell filtering function 112₂ prepares a filtered cell list for inclusion in a filtered list-bearing Iur message 11-4'. In the same manner as described previously with reference to FIG. 9, the measurement list generator 102 uses the filtered list-bearing Iur message 11-4' to prepare and transmit to the user equipment unit a new measurement list message (indicated as event 11-6B' in FIG. 12A). The new measurement list includes cell $C_{2-1}$ and cell $C_{2-3}$ for user equipment unit (UE) 30.

Thus, for the another candidate cell (e.g., the cells which neighbor the cell $C_{2-2}$ involved in the most recent handover), the drift radio network controller (DRNC) can apply the filtering rule for the another candidate cell (e.g., cell $C_{2-3}$ or cell $C_{3-3}$), and then apprise the serving radio network controller (SRNC) whether the another candidate cell should be included in the measurement list. In fact, as shown in FIG. 11A and FIG. 12A, the drift radio network controller (DRNC) may transmit to the serving radio network controller (SRNC) a list of one or more qualifying cells (including the another candidate cell or not, as appropriate) for inclusion in the measurement list.

Although not illustrated as such in FIG. 11A, it should be understood that the filtered list message of event 11-4' is preceded by various events which utilize cell topology table 120 and which are comparable to other events previously discussed, e.g., with reference to the FIG. 3 scenario.

Figure 12B:
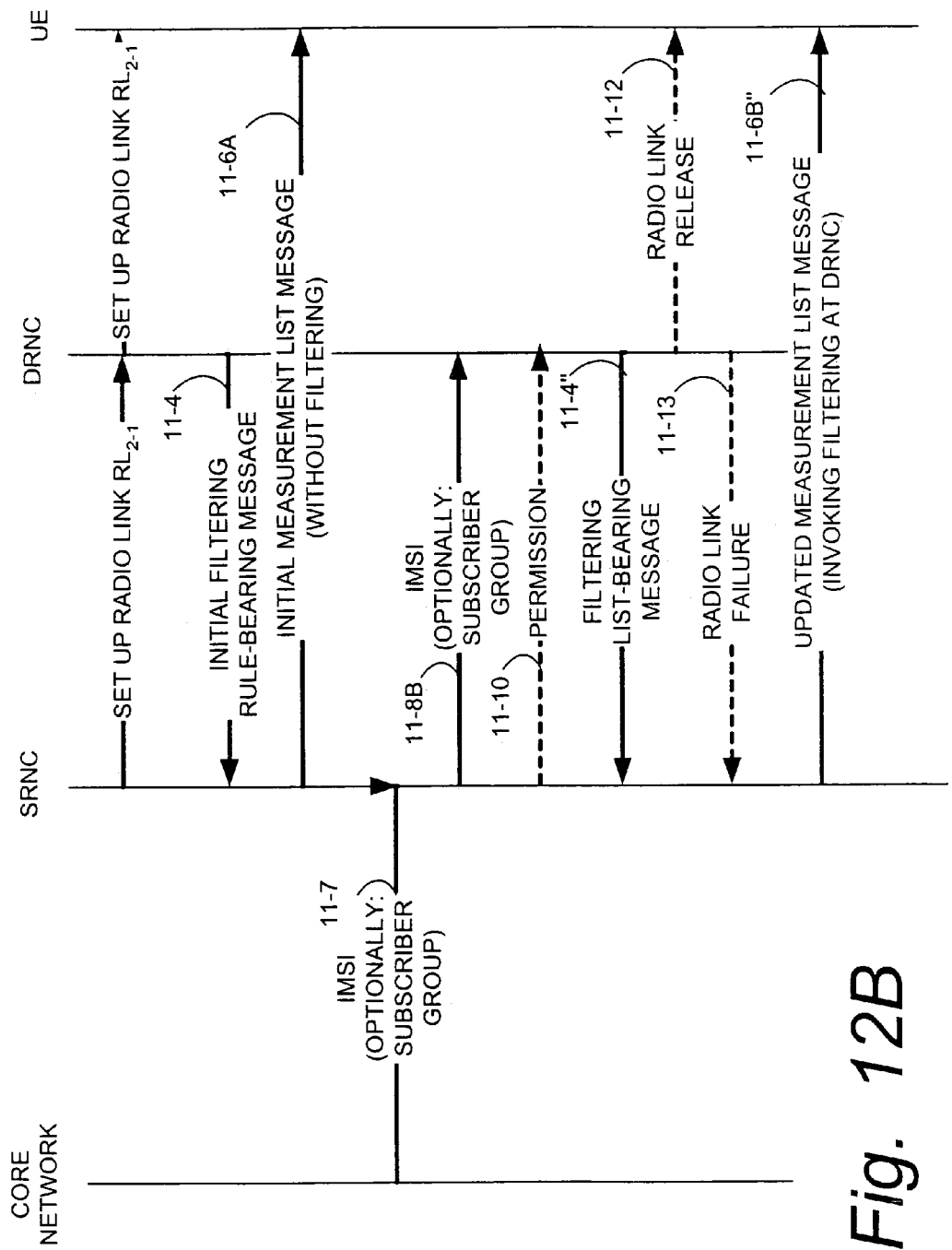
FIG. 12B is a diagrammatic view depicting various messages transmitted in conjunction with the second scenario of the hybrid mode of FIG. 11A.

A second example scenario of the hybrid mode is illustrated in FIG. 11B and FIG. 12B. Like the scenario of FIG. 11 and FIG. 12, the scenario of FIG. 11B and FIG. 12B builds on the previously-described scenario of FIG. 11 and FIG. 12, but only partially. It will again be recalled that, in the scenario of FIG. 11 and FIG. 12, the serving radio network controller (SRNC) had set up one or more radio links for the connection with the user equipment unit in a corresponding one or more cells, but at the time of connection setup the international mobile subscriber identity (IMSI) of the user equipment unit was not yet known by the serving radio network controller (RNC). The drift radio network controller (DRNC) had transmitted to the serving radio network controller (SRNC) a filtering rule-bearing Iur message (indicated by event 11-4) which included a neighboring list field 1102 and a filtering rule field 1100. Since the measurement list generator 102 initially did not know the IMSI of the user equipment unit, the measurement list generator 102 was unable to utilize the filtering rules transmitted in the filtering rule-bearing Iur message, so instead the measurement list generator 102 included all the cells in the neighboring cell list in an initial measurement list message (event 11-6A) transmitted to the user equipment unit. Thereafter the IMSI of the user equipment unit was sent to the serving radio network controller (SRNC).

In the second example scenario of the hybrid mode of FIG. 11B and FIG. 12B, the serving radio network controller (SRNC) sends the IMSI of the user equipment unit to the drift radio network controller (DRNC) and permits the drift radio network controller (DRNC) to invoke its cell filter 904 to apply the filtering rules [rather than performing the filtering at the serving radio network controller (SRNC)]. In this regard, FIG. 11B and FIG. 12B show that the transmission of the IMSI to the user equipment unit as event 11-8B. Since it now knows the IMSI of the user equipment unit and has its own cell filter 904, the cell filtering function 112₂ of the serving radio network controller (SRNC) can henceforth perform cell filtering for the user equipment unit in the manner of the DRNC-self filtering mode of FIG. 9. In like manner as with the first scenario of the hybrid mode, the cell filtering function 112₂ prepares a filtered cell list for inclusion in a filtered list-bearing Iur message 11-4". In the same manner as described previously with reference to FIG. 9, the measurement list generator 102 uses the filtered list-bearing Iur message 11-4B" to prepare and transmit to the user equipment unit a new measurement list message (indicated as event 11-6" in FIG. 12B).

If, in the second scenario of the hybrid mode illustrated in FIG. 11B and FIG. 12B, the drift radio network controller (DRNC) finds that a radio link(s) for the connection with the user equipment unit was impermissibly set up one or more a "not allowed" cell(s) for that user equipment unit, then the drift radio network controller (DRNC) releases such unallowed radio link(s) as indicated by event 11-12 in FIG. 11B. For each such non-allowed radio link, as event 11-13 the drift radio network controller (DRNC) sends a RADIO LINK FAILURE INDICATION to the serving radio network controller (SRNC). If the non-permitted radio link(s) is are the only radio link in the measurement list, the call could be dropped. Since event 11-12 and event 11-13 are contingent upon the drift radio network controller (DRNC) determining that a radio link is not allowed, event 11-12 and event 11-13 are shown with broken lines in FIG. 12B.

FIG. 12, FIG. 12A, and FIG. 12B show (as event 11-7) the core network sending the IMSI of the user equipment unit (UE) to the SRNC. In a variation of the invention, the core network optionally sends (e.g. in addition to the IMSI) the subscriber group (SG) to which the UE belongs. Sending the subscriber group renders unnecessary the SRNC consulting, or even storing, the subscriber group/IMSI table/memory mentioned earlier. Similarly, the subscriber group can optionally be included in the messages of event 11-8 and 11-8B to the DRNC.

In accordance with one, aspect of the invention, the hybrid mode can be made optional or selectively invoked. In this regard, the serving radio network controller (SRNC) can send a permission message to the drift radio network controller (DRNC) whereby the drift radio network controller (DRNC) is given permission to use the filtering rule. Both the scenario of FIG. 11A and FIG. 12A and the scenario of FIG. 11B and FIG. 12B show transmission of such permission message as event 11-10 (event 11-10 being shown as a broken line in view of its optional nature).

It can also be possible to only perform filtering in the drift radio network controller (DRNC) when requested by the serving radio network controller (SRNC). In this regard, a message such as the permission message of event 11-10 can be transmitted from serving radio network controller (SRNC) to drift radio network controller (DRNC) to request drift radio network controller (DRNC)-based filtering. The DRNC-based filtering request message can request filtering of cells at the drift radio network controller (DRNC) for all or selected connections, for a stated period of time, or according to yet other criteria.

The hybrid mode advantageously combines benefits of both the SRNC filtering and the DRNC filtering. For example, failure cases are easier to handle, as the serving radio network controller (SRNC) can move the user equipment unit before releasing the radio link in the drift radio network controller (DRNC) if a radio link should not be setup in the drift radio network controller (DRNC).

In the hybrid mode and the DRNC-filtering rule applying mode, after the drift radio network controller (DRNC) with its cell filter 904 has taken over the process of filtering cells for use in the measurement list only those neighbor cells to which the UE can legitimately handover to are returned to the serving radio network controller (SRNC) in the filtered list-bearing Iur message (e.g., the message of event 11-4', for example). As shown by field 900 of the filtered list-bearing Iur message of event 11-4', the filtering rules for those remaining cells may or may not be included for transmission from the drift radio network controller (DRNC) to the serving radio network controller (SRNC) over the Iur interface. Moreover, whether the filtering rules are to be included in the filtered list-bearing Iur message can be prescribed by a parameter sent from the serving radio network controller (SRNC) to the drift radio network controller (DRNC) in a message such as, for example, the Iur messages known as the RADIO LINK SETUP or RADIO LINK ADDITION messages.

If, in either the hybrid mode or the DRNC-filtering rule applying mode, the IMSI is not available in the drift radio network controller (DRNC), then the drift radio network controller (DRNC) cannot perform filtering. In such case, the drift radio network controller (DRNC) sends all neighbor cells back to the serving radio network controller (SRNC) together with the filtering rules for those cells.

When the serving radio network controller (SRNC) receives the IMSI for a user equipment unit late [after radio link setup/addition for the user equipment unit in the drift radio network controller (DRNC)], and sends the international mobile subscriber identity (IMSI) to the drift radio network controller (DRNC), in one scenario the serving radio network controller (SRNC) can inform the drift radio network controller (DRNC) whether the drift radio network controller (DRNC) should check the filtering rules or not for that user equipment unit. This check would not be necessary if the serving radio network controller (SRNC) had previously received the filtering rules from the drift radio network controller (DRNC). If, however, in this case the drift radio network controller (DRNC) had not returned the filtering rules to the serving radio network controller (SRNC) (due to, for example, the earlier serving radio network controller (SRNC) message specifying not to return the filtering rules), then when the serving radio network controller (SRNC) sends the IMSI onto the drift radio network controller (DRNC), the drift radio network controller (DRNC) can perform the filtering on the IMSI against the cells in the drift radio network controller (DRNC). If the radio link (RL) exists in a cell that is not permitted, the radio link can be released, and the radio link failure message for that radio link sent to the serving radio network controller (SRNC). If the cell having the radio link in the drift radio network controller (DRNC) is permitted, then there is no change, but the drift radio network controller (DRNC) should in this case filter the neighbor cell list using the IMSI, and return the new filtered list to the serving radio network controller (SRNC) so that the serving radio network controller (SRNC) can update the measurement list sent to the user equipment unit.

It was mentioned above, e.g., in conjunction with FIG. 5A(1)-FIG. 5D(1) and FIG. 5A(2)-FIG. 5D(2), that the filtering rule itself as stored in the cell topology table 120 can take various forms or formats. In the event that the serving radio network controller (SRNC) wishes to have the filtering rule transmitted from the drift radio network controller (DRNC) to the serving radio network controller (SRNC) in a format different from that in which the filtering rule is stored in the cell topology table 120, the cell filtering function $112_2$ and particularly the table handling logic 122 can be provided with a filtering rule format translator 1300 such as that shown in FIG. 13. The example filtering rule format translator 1300 includes an input request analyzer 1302; a rule extractor 1304; conversion logic/tables 1306; and, output logic 1308.

The input request analyzer 1302 receives a request from the serving radio network controller (SRNC) which indicates in which format the serving radio network controller (SRNC) desires to receive the filtering rule from the drift radio network controller (DRNC). For example, the format request can be included in a RADIO LINK SETUP REQUEST message from the serving radio network controller (SRNC). When it is time for the filtering rule-bearing Iur message to be prepared and transmitted to the serving radio network controller (SRNC), the filtering rule(s) which are to be included in the filtering rule-bearing Iur message are transmitted via filtering rule extractor 1304 to the conversion logic/tables 1306. In the conversion logic/tables 1306 the filtering rule in the format stored in cell topology table 120 is operated on by an appropriate one of the conversion logic/tables 1306, e.g., a table 1310A to convert the extracted filtering rule to allowed PLMN identifiers or IMSI ranges; a table 1310B to convert the extracted filtering rule to disallowed PLMN identifiers or IMSI ranges; a table 1310C to convert the extracted filtering rule to a bitmap of allowed PLMN identifiers or IMSI ranges; a table 1310D to convert the extracted filtering rule to a bitmap of disallowed PLMN identifiers or IMSI ranges. After the conversion, the 1308 transmit the filtering rule(s), now in the requested converted format, to the inter-RNC messaging function 1102 of the drift radio network controller (DRNC), so that the filtering rule-bearing Iur message can be prepared in the format desired by the serving radio network controller (SRNC).

Figure 13:
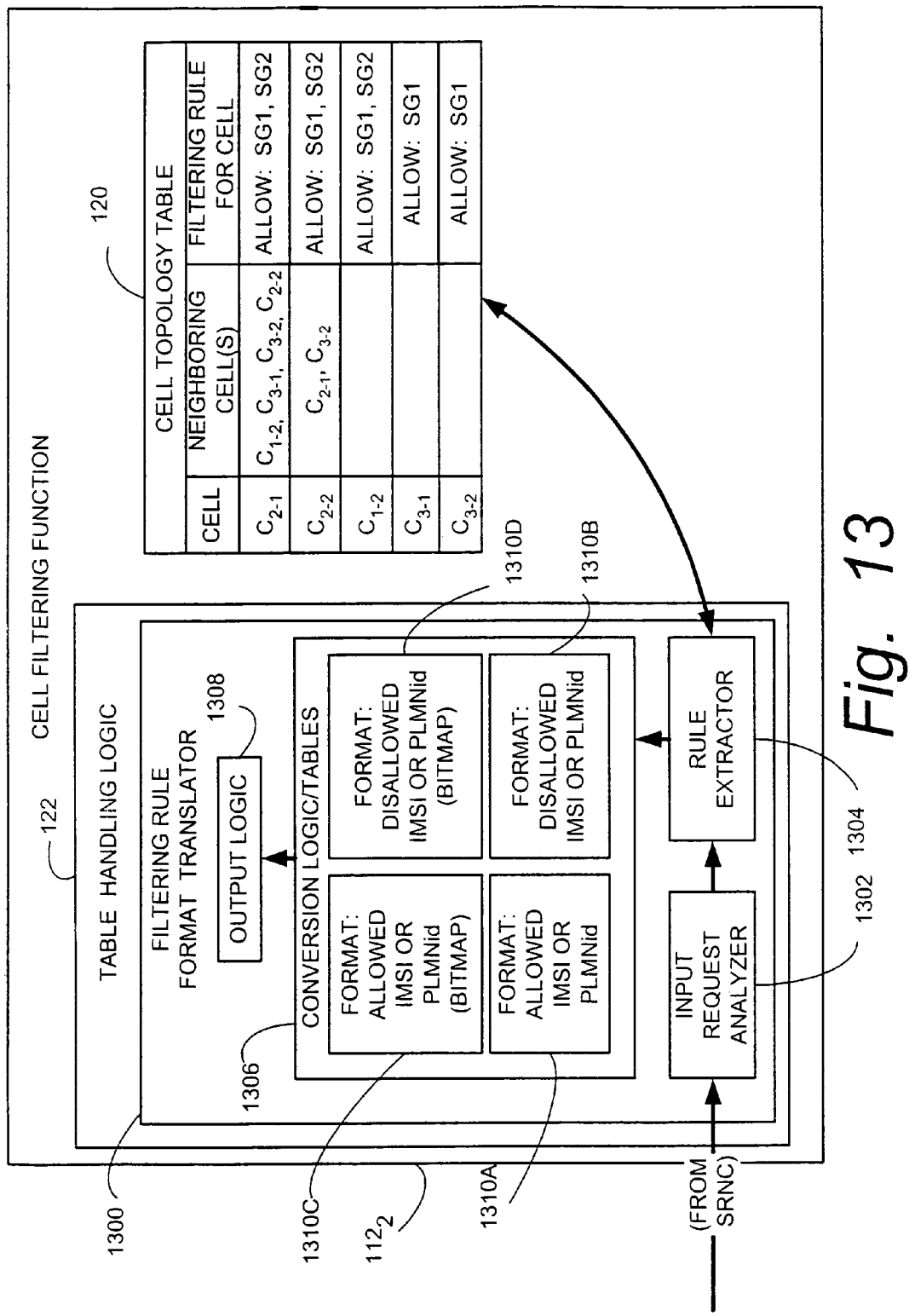
FIG. 13 is a diagrammatic view of a cell filtering function according to one embodiment of the invention, including a filtering rule format translator.

While the filtering rule format translator 1300 has been illustrated in FIG. 13 as being included in the table handling logic 122 of drift radio network controller (DRNC), it should be understood that FIG. 13 is just one example of the structure and location of filtering rule format translator 1300. Other structural configurations and locations are within the scope of the present invention, including translation of the filtering rule format in the serving radio network controller (SRNC) itself.

Certain example messages have been mentioned above for transmissions between the serving radio network controller (SRNC) and the drift radio network controller (DRNC). Requests from the serving radio network controller (SRNC) to the drift radio network controller (DRNC) on whether or not to form filtering in the drift radio network controller (DRNC), and whether or not to return filtering rules for neighboring cells can be (for example) included in the following messages: RADIO LINK SETUP REQUEST, RADIO LINK ADDITION REQUEST. The request whether or not to check the filtering rules for a give user equipment unit can be included in the new proposed COMMON ID message.

It was also mentioned above that the filtering rule(s) can be included in suitable Iur messages in an appropriate information element (IE) or field, such as the "neighboring UMTS cell information" currently specified for various Iur messages. In an illustrated example, the Neighboring FDD Cell Information IE provides information for FDD cells that are neighboring cells to a cell in the DRNC. An example format of the Neighboring FDD Cell Information IE is provided in Table 1. Alternatively, for TDD cells, the Neighboring TDD Cell Information IE shown in Table 2 can be utilized. The Neighboring TDD Cell Information LCR IE shown in Table 3 provides information for 1.28 Mcps TDD cells that are a neighboring cells to a cell in the DRNC. The Allowed Subscribers Indicator, referenced in each of Table 1-Table 3, is an information element which contains a bitmap where pre-configured positions represent PLMN Ids/subscribers' groups which are allowed to access the cell. The Allowed Subscribers Indicator is described in Table 4.

The techniques of the present invention are more advantageous than providing the serving radio network controller (SRNC) with knowledge of all cells in the UTRAN and the filtering rules of all cells. An attempt to configure every radio network controller (RNC) in the UTRAN with the filtering rules of all cells in the UTRAN and in the shared network is not considered practical for the various reasons. A first such reason pertains to capacity: the number of relations to be configured in each RNC would multiply. A second reason pertains to consistency: each time a cell parameter changed in any RNC in UTRAN, all RNCs would have to be updated. In principle, a RNC should not require a network view of all cells.

By contrast, an advantage of the present invention is that the serving radio network controller (SRNC) can perform neighbor cell filtering, both for cells in the serving radio network controller (SRNC) and for cells in the drift radio network controller (DRNC). This gives the serving radio network controller (SRNC) control of which cells are sent to the user equipment unit in the neighbor list. Moreover, it allows selective handover to be fully supported in UTRAN. Additionally, in some modes of the invention, the drift radio network controller (DRNC) can perform filtering. In fact, in the hybrid mode the DRNC filtering can be used together with SRNC filtering in order to improve the efficiency.

In its various aspects, the present invention includes not only the transmission and/or application of the filtering rule by the drift radio network controller (DRNC), but also a network in which the transmission and/or application of the filtering rule occurs as well as the particular drift radio network controller (DRNC) nodes which perform the transmission and/or application of the filtering rule.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

TABLE 1

| IE/Group Name | Presence | Range | IE type and reference | Semantics description | Criticality | Assigned Criticality |
|---|---|---|---|---|---|---|
| Neighbouring FDD Cell Information | | 1 ... <maxnoofFDDneighbours> | | | — | |
| >C-Id | M | | 9.2.1.6 | | — | |
| >UL UARFCN | M | | UARFCN 9.2.1.66 | Corresponds to Nu in ref. [6] | — | |
| >DL UARFCN | M | | UARFCN 9.2.1.66 | Corresponds to Nd in ref. [6] | — | |
| >Frame Offset | O | | 9.2.1.30 | | — | |
| >Primary Scrambling Code | M | | 9.2.1.45 | | — | |
| >Primary CPICH Power | O | | 9.2.1.44 | | — | |
| >Cell Individual Offset | O | | 9.2.1.7 | | — | |
| >Tx Diversity Indicator | M | | 9.2.2.50 | | — | |
| >STTD Support Indicator | O | | 9.2.2.45 | | — | |
| >Closed Loop Mode 1 Support Indicator | O | | 9.2.2.2 | | — | |
| >Closed Loop Mode 2 Support Indicator | O | | 9.2.2.3 | | — | |
| >Restriction State Indicator | O | | 9.2.1.48C | | YES | ignore |
| >Allowed Subscribers Indicator | O | | 9.2.1.x | | YES | ignore |

| Range bound | Explanation |
|---|---|
| MaxnoofFDDneighbours | Maximum number of neighbouring FDD cell for one cell. |

TABLE 2

| IE/Group Name | Presence | Range | IE type and reference | Semantics description | Criticality | Assigned Criticality |
|---|---|---|---|---|---|---|
| Neighbouring TDD Cell Information | | 1 ... <maxnoofTDDneighbours> | | | — | |
| >C-Id | M | | 9.2.1.6 | | — | |
| >UARFCN | M | | 9.2.1.66 | Corresponds to Nt in ref. [7] | — | |
| >Frame Offset | O | | 9.2.1.30 | | — | |
| >Cell Parameter ID | M | | 9.2.1.8 | | — | |
| >Sync Case | M | | 9.2.1.54 | | — | |
| >Time Slot | C-Case1 | | 9.2.1.56 | | — | |
| >SCH Time Slot | C-Case2 | | 9.2.1.51 | | — | |
| >Block STTD Indicator | M | | 9.2.1.4A | | — | |
| >Cell Individual Offset | O | | 9.2.1.7 | | — | |
| >DPCH Constant Value | O | | 9.2.1.23 | | — | |

TABLE 2-continued

| | | | | | |
|---|---|---|---|---|---|
| >PCCPCH Power | O | | 9.2.1.43 | — | |
| >Restriction State Indicator | O | | 9.2.1.48C | YES | q |
| >Allowed Subscribers Indicator | O | | 9.2.1.x | YES | ignore |

| Condition | Explanation |
|---|---|
| Case1 | The IE shall be present if the Sync Case IE is set to "Case1". |
| Case2 | The IE shall be present if the Sync Case IE is set to "Case2". |

| Range bound | Explanation |
|---|---|
| MaxnoofTDDneighbours | Maximum number of neighbouring TDD cell for one cell. |

TABLE 3

| IE/Group Name | Presence | Range | IE type and reference | Semantics description | Criticality | Assigned Criticality |
|---|---|---|---|---|---|---|
| Neighbouring TDD Cell Information LCR | | 1 ... <maxnoofLCRTDDneighbours> | | | — | |
| >C-Id | M | | 9.2.1.6 | | — | |
| >UARFCN | M | | 9.2.1.66 | Corresponds to Nt in ref. [7] | — | |
| >Frame Offset | O | | 9.2.1.30 | | — | |
| >Cell Parameter ID | M | | 9.2.1.8 | | — | |
| >Time Slot LCR | M | | 9.2.3.12a | | — | |
| >Block STTD Indicator | M | | 9.2.1.4A | | — | |
| >Cell Individual Offset | O | | 9.2.1.7 | | — | |
| >DPCH Constant Value | O | | 9.2.1.23 | | — | |
| >PCCPCH Power | O | | 9.2.1.43 | | — | |
| Restriction State Indicator | O | | 9.2.1.48C | | — | |
| >Allowed Subscribers Indicator | O | | 9.2.1.x | | YES | ignore |

| Range bound | Explanation |
|---|---|
| MaxnoofLCRTDDneighboursLCR | Maximum number of neighbouring LCR TDD cell for one cell. |

TABLE 4

| IE/Group Name | Presence | Range | IE type and reference | Semantics description |
|---|---|---|---|---|
| Allowed Subscribers Indicator | | | BIT STRING (16) | Each bit indicates, if set, that the corresponding subscribers' group is allowed to access the cell. Subscribers' groups are numbered from 'Subscribergroup 0' to 'Subscribergroup 15'. The order of bits is to be interpreted according to subclause 9.3.4. |

What is claimed is:

1. A method for determining whether to include a neighboring cell into a measurement list of a user equipment in a communications system, wherein the communications system comprising a radio access network with a radio network controller adapted to choose a selected cell as a candidate cell to which to handover the user equipment based on measured signal strength results for cells in the measurement list, the communications system further comprising a core network, wherein the radio network controller being connected to the core network, the method comprising the steps of:

determining in the core network a subscriber group information for the user equipment according to a subscriber identity of the user equipment, the subscriber group information comprising a public land mobile network (PLMN) identifier, the core network sending the subscriber group information for the user equipment in addition to the subscriber identity of the user equipment to an access node so that the access node does not determine the subscriber group information from the subscriber identity, determining a filtering rule for the neighboring cell in the access node, and including the neighboring cell into the measurement list for the user equipment according to the result of the filtering rule for the subscriber group information.

2. The method of claim 1, wherein the filtering rule is a list of subscriber groups which are allowed for the candidate cell.

3. The method of claim 1, wherein the filtering rule is a list of subscriber groups which are not allowed for the candidate cell.

4. The method of claim 1, wherein the filtering rule is a list of PLMN identifiers or IMSI (international mobile subscribe identity) ranges which are allowed for the candidate cell.

5. The method of claim 1, wherein the filtering rule is a list of PLMN identifiers or IMSI (international mobile subscribe identity) ranges which are not allowed for the candidate cell.

6. The method of claim 1, wherein the filtering rule is stored in a drift radio network controller (DRNC) as a bitmap.

7. The method of claim 1, wherein the filtering rule is stored per cell relation, where a cell relation points to a target cell to which a source cell can handover.

8. The method of claim 1, wherein the subscriber group information comprises one or more (IMSI)—PLMNs (international mobile subscriber identity—public land mobile networks).

9. A communications system comprising:
a core network configured to determine subscriber group information for a user equipment according to a subscriber identity of the user equipment, the subscriber group information comprising public land mobile network (PLMN) identifier;
a radio access network comprising an access node, the access node being connected to the core network and adapted (1) to receive the subscriber group information for the user equipment from the core network in addition to the subscriber identity of the user equipment so that the access node does not determine the subscriber group information from the subscriber identity; (2) to determine a filtering rule for a neighboring cell; (3) to include the neighboring cell into a measurement list for the user equipment according to the result of the filtering rule for the subscriber group information; and (4) to choose a selected cell as a candidate cell to which to handover the user equipment based on measured signal strength results for cells in the measurement list.

10. The communications system of claim 9, wherein the filtering rule is a list of subscriber groups which are allowed for the candidate cell.

11. The communications system of claim 9, wherein the filtering rule is a list of subscriber groups which are not allowed for the candidate cell.

12. The communications system of claim 9, wherein the filtering rule is a list of PLMN identifiers or IMSI (international mobile subscribe identity) ranges which are allowed for the candidate cell.

13. The communications system of claim 9, wherein the filtering rule is a list of PLMN identifiers or IMSI (international mobile subscribe identity) ranges which are not allowed for the candidate cell.

14. The communications system of claim 9, wherein the filtering rule is stored in a drift radio network controller (DRNC) as a bitmap.

15. The communications system of claim 9, wherein the filtering rule is stored per cell relation, where a cell relation points to a target cell to which a source cell can handover.

16. The communications system of claim 9, wherein the access node is a serving radio network controller.

17. The system of claim 9, wherein the subscriber group information comprises one or more (IMSI)—PLMNs (international mobile subscriber identity—public land mobile networks).

18. An access node of a radio access network which is connected to a core network, the access node comprising:
means for receiving subscriber group information for a user equipment in addition to the subscriber identity of the user equipment from the core network, the subscriber group information comprising a public land mobile network (PLMN) identifier;
means for determining a filtering rule for a neighboring cell;
means for including the neighboring cell into a measurement list for the user equipment according to the result of the filtering rule for the subscriber group information without the access node having to determine the subscriber group information from the subscriber identity; and
means for choosing a selected cell as a candidate cell to which to handover the user equipment based on measured signal strength results for cells in the measurement list.

19. The access node of claim 18, wherein the filtering rule is a list of subscriber groups which are allowed for the candidate cell.

20. The access node of claim 18, wherein the filtering rule is a list of subscriber groups which are not allowed for the candidate cell.

21. The access node of claim 18, wherein the filtering rule is a list of PLMN identifiers or IMSI (international mobile subscribe identity) ranges which are allowed for the candidate cell.

22. The access node of claim 18, wherein the filtering rule is a list of PLMN identifiers or IMSI (international mobile subscribe identity) ranges which are not allowed for the candidate cell.

23. The access node of claim 18, wherein the filtering rule is stored in a drift radio network controller (DRNC) as a bitmap.

24. The access node of claim 18, wherein the filtering rule is stored per cell relation, where a cell relation points to a target cell to which a source cell can handover.

25. The access node of claim 18, wherein the access node is a serving radio network controller.

26. The access node of claim 18, wherein the subscriber group information comprises one or more (IMSI)—PLMNs (international mobile subscriber identity—public land mobile networks).

* * * * *

UNITED STATES PATENT AND TRADEMARK OFFICE
CERTIFICATE OF CORRECTION

| | |
|---|---|
| PATENT NO. | : 8,380,205 B2 |
| APPLICATION NO. | : 11/635797 |
| DATED | : February 19, 2013 |
| INVENTOR(S) | : Hogan |

It is certified that error appears in the above-identified patent and that said Letters Patent is hereby corrected as shown below:

In the Drawings:

In Fig. 10, Sheet 13 of 20, for Tag "10-1", in Line 3, delete "NEITHBORING" and insert -- NEIGHBORING --, therefor.

In the Specifications:

In Column 10, Line 13, delete "controller $26_1$." and insert -- controller 26. --, therefor.

In Column 13, Line 65, delete "(SG)" and insert -- (SG1) --, therefor.

In Column 22, Line 37, delete "(SRNC) 25," and insert -- (SRNC) $25_1$ --, therefor.

In Column 24, Line 26, delete "is are" and insert -- is/are --, therefor.

In Column 24, Line 43, delete "one," and insert -- one --, therefor.

Signed and Sealed this
Twenty-fourth Day of September, 2013

Teresa Stanek Rea
*Deputy Director of the United States Patent and Trademark Office*